US012578517B2

(12) United States Patent
Khoshnegar Shahrestani

(10) Patent No.: US 12,578,517 B2
(45) Date of Patent: Mar. 17, 2026

(54) DIFFRACTIVE DISPLAYS

(71) Applicant: NANOTECH SECURITY CORP., Burnaby (CA)

(72) Inventor: Milad Khoshnegar Shahrestani, Coquitlam (CA)

(73) Assignee: Authentix, Inc., Addison, TX (US)

( * ) Notice: Subject to any disclaimer, the term of this patent is extended or adjusted under 35 U.S.C. 154(b) by 0 days.

(21) Appl. No.: 18/837,826

(22) PCT Filed: Dec. 13, 2022

(86) PCT No.: PCT/IB2022/062167
§ 371 (c)(1),
(2) Date: Aug. 12, 2024

(87) PCT Pub. No.: WO2023/111864
PCT Pub. Date: Jun. 22, 2023

(65) Prior Publication Data
US 2025/0147209 A1     May 8, 2025

Related U.S. Application Data

(60) Provisional application No. 63/289,125, filed on Dec. 13, 2021.

(51) Int. Cl.
*B42D 25/328* (2014.01)
*G02B 5/18* (2006.01)
*G02B 27/42* (2006.01)

(52) U.S. Cl.
CPC .............. *G02B 5/18* (2013.01); *B42D 25/328* (2014.10); *G02B 5/1842* (2013.01); *G02B 27/42* (2013.01)

(58) Field of Classification Search
CPC .................................................... G02B 5/1842
See application file for complete search history.

(56) References Cited

U.S. PATENT DOCUMENTS

| | | | |
|---|---|---|---|
| 5,986,781 A | 11/1999 | Long | |
| 2015/0042702 A1* | 2/2015 | Jiang ...................... | G02B 1/005 |
| | | | 345/694 |
| 2016/0107471 A1* | 4/2016 | Landrock ........... | H01J 37/3174 |
| | | | 359/569 |
| 2016/0116649 A1 | 4/2016 | Landrock et al. | |
| 2020/0341174 A1 | 10/2020 | Keshavarz Akhlaghi et al. | |

FOREIGN PATENT DOCUMENTS

| | | | | | |
|---|---|---|---|---|---|
| AU | 2012349329 B2 | * | 1/2015 | ........... | B42D 25/324 |
| DE | 102009012300 A1 | * | 9/2010 | ............ | B42D 25/29 |
| DE | 102016015335 A1 | * | 6/2018 | ........... | G02B 5/1842 |
| EP | 3317114 A1 | | 5/2018 | | |
| WO | WO-2013039454 A1 | * | 3/2013 | ............ | B42D 25/36 |
| WO | 2019164542 A1 | | 8/2019 | | |
| WO | 2022130346 A1 | | 6/2022 | | |

OTHER PUBLICATIONS

Foreign Communication from Related Application—International Search Report and Written Opinion of the International Searching Authority, International Application No. PCT/IB2022/062167, dated Mar. 30, 2023, 13 pages.

* cited by examiner

*Primary Examiner* — Kyle R Grabowski
(74) *Attorney, Agent, or Firm* — Conley Rose, P.C.; Rodney B. Carroll

(57) ABSTRACT

The present disclosure provides a diffractive display for displaying a diffracted image, an article, comprising the diffractive display, and methods of forming a display for displaying a diffracted image.

15 Claims, 13 Drawing Sheets

100

Without metastructures

Frame 1

Frame 64

With metastructures

Tilted horizontally

Frame 32

Tilted Vertically

DIFFRACTIVE DISPLAYS

This application is a filing under 35 U.S.C. 371 as the National Stage of International Application No. PCT/IB2022/062167 filed Dec. 13, 2022 and entitled "Diffractive Displays", which claims priority to U.S. Provisional Application No. 63/289,125 filed Dec. 13, 2021, which are hereby incorporated by reference in their entirety.

FIELD OF THE DISCLOSURE

Background

A passive diffractive display employs the diffraction of micro- or nano-sized interference patterns to form a holographic light field which may render a static image, a 3D object or animation, when the displayed is rotated relative to a light source or an observer.

A passive diffractive display may embed a plurality of diffractive pixels, each embedding a plurality of periodic micro-scale or nano-scale light scatterers. The superposition of the interfering wave components from the scatterers may lead to a constructive or destructive interference at the observation point. The collective interference from scatterers within each diffractive pixel leads to the dispersion of the incident wave energy into the diffraction channels, whose contribution from the total incident wave energy depends on several parameters such as incidence angle, periodicity, and the channel order.

The efficiency of the diffraction within each channel depends on the channel order, whereas the total diffraction efficiency of the diffractive pixel is impacted by the refractive index contrast of the diffracting material and the surrounding medium. Depending on the application, high refractive index (HRI) materials (Si, TiO2, Nb2O5, Ge, SiN) may be used for transmissive diffraction pixels and metallic materials (Al, Ag, Cr) may be employed for reflective diffraction pixels. The thickness of the HRI or metallic layers can be fine-tuned to enable the diffractive pixel to operate in both transmissive and reflective modes.

A diffraction pixel diffracts the incident light at the diffraction wavelength into certain diffraction channels angularly arranged in space, where the diffraction angle of each channel is determined by the incidence angle, periodicity of scatterers, and diffraction wavelength. When excited with a broadband spectrum of colors, often referred to as "white light", a diffraction pixel may rainbow by diffracting spectral components of the incident light into closely angled diffraction channels of different wavelengths. The diffractive scatterers can be configured to maximize the diffraction efficiency for a particular diffraction order at a certain wavelength. Examples of these optimized scatterers are blazed and slanted gratings.

In a passive diffractive display, diffractive scatterers of each pixel (picture element), which pixels may be referred to herein as a frame-pixel, may be configured such that the directions of the diffraction channels, which may be referred to herein as the direction of the fundamental diffraction orders, substantially align such that the light diffracted from the pixels forms an image along the direction of the diffractive channels. The direction of the diffraction channels determines the viewing angle of the image formed by the light diffracted light from the pixels. Often the passive diffractive display is configured such that an image is viewable in a range of angles around the viewing angle, with the viewable range of angles being referred to as a viewing zone of the image.

A diffractive pixel may appear "colorless" or dim outside the spatial proximity space of the pixel's diffraction channels. In the case of a reflective diffraction pixel, for example, the pixel may look high gloss or metallic with high specular reflection. This high gloss or metallic appearance may result in degraded diffractive display appearance at angles remote from the diffraction channels.

Conventional approaches to reducing reflection in active diffractive displays is to apply an anti-reflection layer over top and separate from the device layer, or to provide an absorptive layer that is separate from the device layer to provide a black background. Anti-reflection multilayer stacks may be utilized in diffractive displays, though typically, due to their thickness, they are not utilized in diffractive displays incorporated into security features on, for example, bank notes.

What is needed are improvements in passive diffractive displays to provide thin devices capable of providing colored imagery within and/or outside the viewing angles corresponding to the diffraction channels of the display.

SUMMARY

It has been discovered that absorptive metastructures and diffractive structures can be incorporated into a single layer of a diffractive display in a manner that allows for the generation of color imagery viewable over a narrow range of viewing angles. This discovery has been exploited to develop the present disclosure, which, at least in part provides examples of passive diffractive displays that incorporate both absorptive metastructures and diffractive structures in frame-pixels capable of generating vivid, colored diffractive images at different viewing angles.

In the general case of a diffractive light field display, where diffracted light from diffractive frame-pixels is distributed in space in order to create the light field, the reflection from the adjacent pixels may interfere with the light that is diffracted from a particular pixel, resulting in a decrease in the signal-to-noise (SNR) ratio of the light diffracted from the particular pixel.

In passive diffractive displays generally, differences in the brightness (e.g., but not limited to, relative brightness compared to other frame-pixels when illuminated with the same white light source), and in the case of color passive diffractive displays, the color of the light that is diffracted from the frame-pixels results in the image seen by an observer viewing the display in the viewing zone. For a reflective display, the brightness of a frame-pixel depends on the intensity of illumination on the frame-pixel and the proportion of the incident light reflected from the frame-pixel, i.e., the reflectance. The differences in brightness and color result, in part, from the differences in the size of the area of the diffractive structures of each pixel. The ratio of the area of a frame-pixel that is populated by diffractive scatters to the total frame-pixel area may be referred to as the filling factor.

The filling factor may range between about 0 and about 1 from pixel to pixel such that, in general, at least some frame-pixels may include a region that is occupied by or populated with diffractive structures, and another separate region that is not occupied by diffractive structures, which other region may be referred to herein as the unoccupied or unpopulated region or area of the frame-pixel. The diffractive structures in the populated region of each frame-pixel function to diffract light along the viewing angle associated with the diffractive structures of that frame-pixel, and the unpopulated region of each frame-pixel may function as a reflector. Along the viewing angle associated with a frame-pixel, the light reflected from the unpopulated region of that frame-pixel adds to the noise level of the light diffracted from the populated region, reducing intra-pixel SNR for that frame-pixel. In addition, the light reflected from the unpopulated regions of other frame-pixels and light reflection from diffractive structures of other frame-pixels having a differing viewing angle, may contribute to pixel-to-pixel, or inter-pixel, noise, reducing inter-pixel SNR.

When viewing the display along a viewing angle associated with a certain frame-pixel, only the diffractive elements within that frame-pixel are "on", i.e., contributing the diffracted light the observer views along the viewing angle. At the viewing angle, the observer is essentially outside of viewing zone of diffractive elements in the adjacent frame-pixels having different viewing angles and, therefore, those diffractive elements in the adjacent frame-pixels also add reflect light from existing light sources in the environment and add to noise level observed along the viewing angle. This particularly so when the diffractive display is excited by multiple light sources in the environment, which is most often the case.

Examples of the present disclosure relate to diffractive displays to address the above issues of reflection resulting in intra-pixel and inter-pixel SNR reduction. The diffractive displays according to examples of the present disclosure include an absorptive sub-pixel in the unpopulated region of at least some of the frame-pixels. The absorptive sub-pixels included in examples of the present disclosure function as omnidirectional absorbers which not only reduce the reflection the incoming light but also absorb the unwanted portion of the incident light energy together with the scattered light.

In the present disclosure, examples are described in the context of passive diffractive displays in which incident light is diffracted and reflected off the display surface. However, the concepts described herein may be applied to non-passive, active displays.

In an, the present disclosure provides a diffractive display for displaying a diffracted image at a viewing angle, the diffractive display including a substrate having a plurality of frame-pixels corresponding to the diffracted image, each frame-pixel corresponding to the diffracted image including at least one diffractive structure disposed on the substrate configured to have a fundamental diffraction order along the viewing angle of the diffracted image, the at least one diffractive structure occupying a first region of the substrate of the frame-pixel, and at least some of the frame-pixels corresponding to the image including absorptive metastructures disposed on the substrate, the absorptive metastructures configured to have a light absorption resonance in the visible spectrum, the absorptive structure occupying a second region of the substrate of the pixel that is non-overlapping with the first region.

In an example, the absorptive metastructures comprised of a plurality of nanostructure scatterers formed of a metallic material or a high refractive index (HRI) dielectric material.

In an example, for each of the at least some frame-pixels the size of the second region occupied by the absorptive structure is determined by a weighting factor for that frame-pixel such that the light reflected by the frame-pixel has a selected brightness, and the light reflected from all of the frame-pixels forms a reflected image.

In an example, for each of the at least some frame-pixels the absorptive metastructures are configured to reflect a desired wavelength of light, and wherein the size of the second region is determined based on the weighting factor such that the light reflected by the absorptive metastructures of the frame-pixel has a selected brightness, hue, and saturation, and the light reflected from the absorptive metastructures of all of the frame-pixels forms the reflected image.

In an example, for each of the at least some frame-pixels, the absorptive metastructures comprise a plurality of sets of absorptive metastructures, each set of absorptive metastructures configured to reflect a different wavelength of light, and wherein the size of each of the sets of absorptive metastructures is determined by the weighting factor such that the light reflected from all of the sets of absorptive structures of the frame-pixel has the selected brightness, hue, and saturation, and the light reflected from all of the absorptive structures of the frame-pixels forms the reflected image in multiple colors.

In an example, the diffracted image comprises a plurality of diffracted images, each of the plurality of diffracted images displayed at a unique viewing angle, the substrate comprising a plurality of set of frame-pixels, each of the plurality of sets of frame-pixels corresponding to a respective one of the plurality of diffracted images, for each set of frame-pixels the at least one diffractive structure disposed on the substrate of each of the frame-pixels of the set is configured to have a direction of a fundamental diffraction order along the viewing angle of the diffracted image associated with the set of frame-pixels, the at least one diffractive structure occupying the first region of the substrate of the frame-pixel, and at least some of the frame-pixels of the set including the absorptive metastructures disposed on the substrate in the second region of the substrate of the frame-pixel that is non-overlapping with the first region.

In an example, the substrate includes a plurality of micro-pixels, each micro-pixel including one unique frame-pixel for each of the sets of frame-pixels.

In an example, each micro-pixel includes a plurality of facets formed by the substrate, each facet having a surface normal that is non-parallel to the surface normal of the other facets of the micro-pixel, wherein the frame-pixels of the micro-pixel are included on the facets.

In an example, the surface normals of the plurality of facets of each micro-pixel differ in azimuthal angle but are substantially parallel in polar angle such that the azimuthal angle of the direction of the fundamental diffraction order of each diffractive element is primarily determined by the azimuthal angle of the facet on which the frame-pixel of the diffractive element is located.

In an example, for each facet of the micro-pixels for each of the at least some frame-pixels located on the facet the size of the second region occupied by the absorptive structure is determined by a weighting factor for that frame-pixel such that the light reflected by the frame-pixel has a selected brightness, and the light reflected from all of the frame-pixels of each set of corresponding facets on all of the micro-pixels forms a reflected image corresponding to that set of facets viewable at a viewing angle determined by the surface normals of the set of corresponding facets.

In an example, for each of the at least some frame-pixels, the absorptive metastructures are configured to reflect a desired wavelength of light, and wherein the size of the second region is determined based on the weighting factor such that the light reflected by the absorptive metastructures of the frame-pixel has a selected brightness, hue, and saturation, and the light reflected from the all of the frame-pixels of each set of corresponding facets on all of the micro-pixels forms a reflected image corresponding to that set of facets.

In an example, for each of the at least some frame-pixels, the absorptive metastructures comprise a plurality of sets of absorptive metastructures, each set of absorptive metastructures configured to reflect a different wavelength of light, and the size of each of the sets of absorptive metastructures is determined by the weighting factor such that the light reflected from all of the sets of absorptive structures of the frame-pixel has the selected brightness, hue, and saturation, and the light reflected from all of the absorptive structures of the frame-pixels of each set of corresponding facets on all of the micro-pixels forms a reflected image corresponding to that set of facets.

BRIEF DESCRIPTION OF THE DRAWINGS

Examples of the present disclosure will now be described, by way of example only, with reference to the attached Figures. The foregoing and other objects of the present disclosure, the various features thereof, as well as the disclosure itself may be more fully understood from the following description, when read together with the accompanying drawings in which.

DETAILED DESCRIPTION

Figure 1:
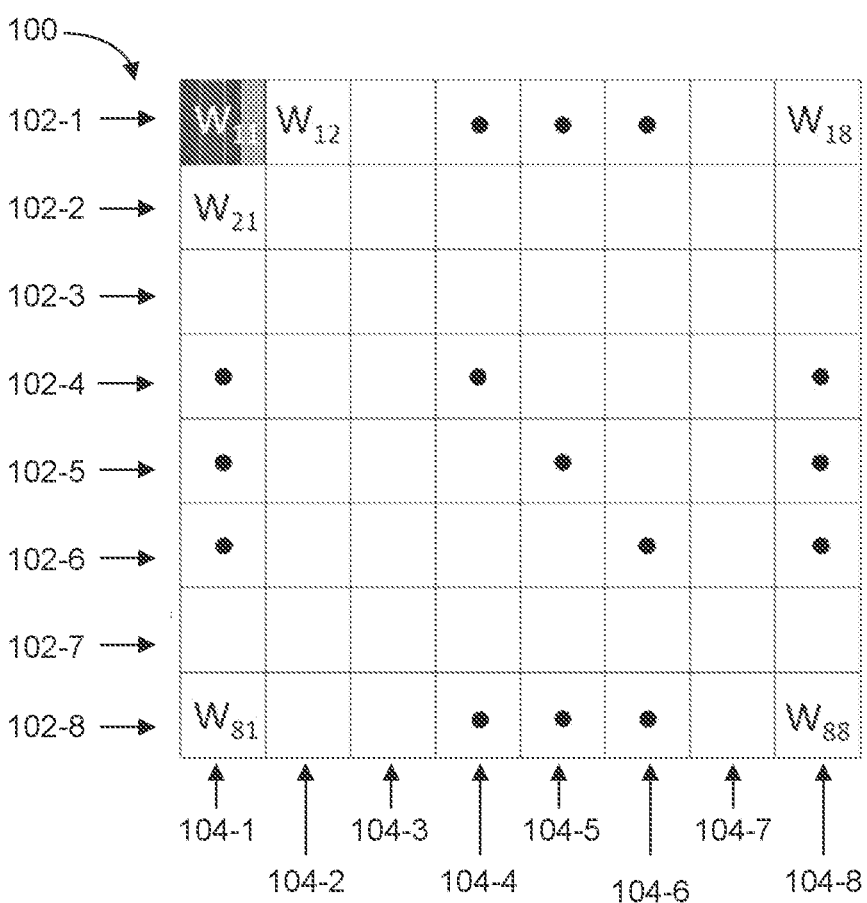
FIG. 1 is a schematic representation of an example of a portion of a passive diffractive display according to an example of the present disclosure.

The disclosures of these patents, patent applications, and publications in their entireties are hereby incorporated by reference into this application in order to more fully describe the state of the art as known to those skilled therein as of the date of the invention described and claimed herein. The instant disclosure will govern in the instance that there is any inconsistency between the patents, patent applications, and publications and this disclosure.

Unless defined otherwise, all technical and scientific terms used herein have the same meaning as commonly understood by one of ordinary skill in the art to which this disclosure belongs. The initial definition provided for a group or term herein applies to that group or term throughout the present specification individually or as part of another group, unless otherwise indicated.

As used herein, the articles "a" and "an" refer to one or to more than one (i.e., to at least one) of the grammatical object of the article. By way of example, "an element" means one element or more than one element.

Use of the term "including" as well as other forms, such as "include," "includes," and "included," is not limiting.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±20% or ±10%, including ±5%, ±1%, and ±0.1% from the specified value, as such variations are appropriate to perform the disclosed methods.

In the present disclosure, "frame-pixel" refers to a single pixel (or picture element) associated with a single image. In some instances, as described in more detail below, a passive diffractive display may be configured to display more than one image, and in this case the frame-pixels may be grouped into "micro-pixels" in which each micro-pixel includes multiple frame-pixels, where each frame-pixel corresponds to a pixel for forming each of the different images displayed by the display.

As used herein, a "metastructure" is a structure having features, such as patterns, that are smaller than an operative wavelength of radiation for the metastructure, where the composition, size, and shape of features affect the interaction of the metastructure with radiation at the operative wavelength to impart properties that are different from those of the bulk constituent materials. An "absorptive metastructure" is a metastructure that demonstrates enhanced absorption of radiation at the operative wavelength(s) compared to the constituent materials and/or other wavelengths. Examples of absorptive metastructures include plasmonic structures configured to preferentially absorb certain wavelength ranges (e.g., but not limited to, colors) and reflect others.

As used herein, a "nanostructure" is a structure having at least one nanoscopic dimension (e.g., but not limited to, a dimension less than one micron, such as about 500 nm or less, about 200 nm or less, about 100 nm or less, about 50 nm or less, about 20 nm or less). A "nanostructure scatterer" refers to a nanostructure that scatters light.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components have not been described in detail to avoid obscuring the examples described.

An example of a portion 100 of a passive diffractive display is shown in FIG. 1. The portion 100 includes sixty-four frame-pixels arranged in rows 102-1 to 102-8 and columns 104-1 to 104-8. The frame-pixels of the example portion 100 shown FIG. 1 may be sized between about 1 μm and a few hundred microns wide. It may be desirable that the frame-pixels included portion 100 be between about 4 μm and about 72 μm wide because below about 4 μm may not provide sufficient area to accommodate the diffractive structures of the sub-pixel elements, and about 72 μm is approximately the resolution of the human eye, meaning that the image produced by the diffractive display may be degraded as the frame-pixel size increases over about 72 μm.

The light field of an image or images displayed by the passive diffractive display is constructed by arranging the plurality of frame-pixels on the passive diffractive display. The angular and color characteristics of the light diffracted from a frame-pixel is determined by the diffracting structure or structures located on the frame-pixels. The diffractive structures on the frame-pixels are constructed to provide the desired light field that results in the image displayed by the passive diffractive display. The light diffracted from each of the frame-pixels associated with an image or frame may have an associated color value, or a brightness value, or both a color value and a brightness value, along a certain range of spatial angles that corresponds with the viewing angle. The range of spatial angles defining the viewing zone of the image. The diffractive structures included in the frame-pixels may be, for example, blazed gratings.

In an example, the pixels of the portion 100 of the passive diffractive display shown in FIG. 1 may all relate to a single static image viewable at a viewing angle with respect to the portion 100 of the passive diffractive display. In this case, the diffractive structures of each of the pixels, which may be referred to herein as frame-pixels, are configured to have the direction of the primary diffraction channels substantially aligned with the direction of the viewing angle such that an observer views the static image composed of the diffracted light from the frame-pixels when the observer views the passive diffractive display along the viewing angle.

In an alternative example, the passive diffractive display that includes the example portion 100 shown in FIG. 1 may display multiple images, each image viewable at a respective different viewing angle. Each of the images, which may be referred to herein as frames, may be, for example, a respective frame of an animated sequence or a respective perspective of a three-dimensional (3D) object. Because the different frames are viewable at different viewing angles, as the angle at which an observer views the passive diffractive display changes, the image seen by the observer may change. This change between the different frames is experienced by the observer as either a moving image in the example of the frame corresponding to frames of an animated sequence, or as a 3D object in the case in which the frames correspond to different perspectives of an object. Alternatively, or additionally, some of the frames may be of the same image, but viewable at different viewing angles in order to increase the size of the viewing zone that that image is viewable at.

When the passive diffractive display displays multiple images, each image is generated from a unique set of frame-pixels of the passive diffractive display. As set out above, the passive diffractive display may be divided into micro-pixels, with each micro-pixel including a frame-pixel for each frame. The number of frame-pixels included in each micro-pixel depends on the number of frames displayed by the passive diffractive display such that, for each image, each micro-pixel includes a respective frame-pixel associated with that image.

The frame-pixels may be arranged in a micro-pixels in multiple different ways. For example, if the passive diffractive display is configured to display eight frames, then each micro-pixel contains 8 frame-pixels. The frame-pixels may be arranged such that, for example, the frame-pixels of each of the rows 102-1 to 102-8, or each of the columns 104-1 to 104-8 are grouped into a unique micro-pixel comprising eight frame-pixels. Alternatively, the micro-pixels may be configured in a 2×4 arrangement, such that for example the frame-pixels in rows 102-1 and 102-2 from columns 104-1 to 104-4 form a micro-pixel, or the frame-pixels in rows 102-1 to 102-4 from columns 104-1 and 104-2 form a micro-pixel. In an example in which sixty-four images are displayable by the passive diffractive display at different viewing angles, all of the sixty-four frame-pixels included in the portion 100 shown in FIG. 1 would comprise a single micro-pixel.

To provide a color image, each frame-pixel associated with the color image may include a set of sub-pixels. Each of the diffractive sub-pixels of a frame-pixel may include a diffractive structure, such as periodically arranged blazing gratings, that are configured to diffract a particular wavelength of light along the same direction, corresponding to the viewing angle. The number of sub-pixels included in a frame-pixel depends on the number of basis colors designated for the diffractive display. In the present disclosure, the standard red (R), green (G) and blue (B) color bases are described. However, in general, the subset of basis colors can be any combination of additive or subtractive color basis sets commonly used in display industry.

As noted previously, in conventional passive diffractive passive displays, most frame-pixels are only partially populated with diffractive structures, leaving an unpopulated region of the display area flat and covered with coating materials and typically reflects incident light. Therefore, as described in more detail below, populating this unpopulated region with an absorptive material, such as absorptive metasurface structures, may substantially reduce unwanted specular reflection and the total noise that is present in convention passive diffractive displays.

Figure 2:
FIG. 2 is a schematic representation of an example a frame-pixel of a passive diffractive display according to an example of the present disclosure.

An example of a frame-pixel 200 that includes such absorptive materials is shown in FIG. 2. The example frame-pixel 200 includes three sub-pixels 202, 204, and 206 that are each respectively associated with, for example, the R, G, B color bases. Each of the sub-pixels 202, 204, and 206 includes respective diffractive structures 208, 210, and 212. The three sets of diffractive structures 208, 210, and 212 of the sub-pixels 202, 204, and 206 populate a first region 214 of the frame-pixel 200. Although the example frame-pixel 200 shown in FIG. 2 includes R, G, and B color bases, other examples the region 214 may be populated with sub-pixels based on any suitable color basis and may include more or less than three sub-pixels.

As discussed previously, in conventional passive diffractive displays, the unpopulated region 216 of the frame-pixel 200 other than the region 214 occupied by the diffractive structures 208, 210, and 212 is unoccupied and contributes to refection of the incident light, leading to inter-pixel and intra-pixel noise that reduces the SNR. In the example frame-pixel 200, the unpopulated region 216 of the frame-pixel includes an absorptive material 218. The absorptive material 218 may be any material that suitably includes a light absorption resonance in the visible spectrum. Desirably the absorptive material 218 provides broadband absorption over much of the visible spectrum. As described in more detail below, the absorptive material 218 may be, for example, an absorptive metastructure composed of multiple nanostructure scatterers formed of a metallic material or a high refractive index (HRI) dielectric material.

The periodicities of the sub-pixel diffractive structures 208, 210, and 212 are chosen such that their fundamental diffraction orders are aligned along the viewing angle of the image associated with the frame-pixel 200. The areas of each of diffractive sub-pixels 202, 204, and 206, as well as the diffraction efficiency due to the structure of the diffractive structure, are chosen to deliver desired hue, saturation and brightness values for the frame-pixel when combined with the absorptive metastructure sub-pixels. The absorptive metastructures may be controllably weighted according to a weighting factor, $W_{ij}$, to tune the frame-pixel's absorption efficiency and its hue, saturation and brightness. The weighting factors, $W_{ij}$, for each of the frame-pixels are illustrated in FIG. 1. The weighting factor, $W_{ij}$, of a frame-pixel is related to the filling factor of the absorptive structures that are included in the portion of the frame-pixel 200 that is not occupied by the diffractive sub-pixels 202, 204, and 206.

In a single frame-pixel 200, the optical power of the incident light is dispersed into four different components $I_k(\theta_i,\varphi_i)=D_k(\theta_{oD},\varphi_{oD})+R_k(\theta_{oR},\varphi_{oR})+A_k(\theta_{oA},\varphi_{oA})+T_k(\theta_{oT},\varphi_{oT})$, where I is the incident optical power, D is the diffracted component of light, R is the scattered light off the surface, which can be simply an unwanted reflection, A is the portion of light absorbed to the surface, and T is the portion of light transmitted through the surface. $\theta_o$ and $\varphi_o$ represent the polar and azimuthal angles of the incoming (i) and outgoing (oD, oR, oA, oT) light of each of the D, R, A, and T components. Subscript k=g, m specifies where the electromagnetic wave may interact with the nanostructures of the frame-pixel, either in the grating area (g) or metasurface area (m). The signal and noise received from each frame-pixel of the diffractive display operating in reflection mode can be defined as signal, $S=D_g$, and noise, $N=R_g+R_m+\alpha T_g+\beta T_m$, where $\alpha T_g$ and $\beta T_m$ are part of the transmitted light which might be reflected back from the underlying display layers and contributing to the overall noise. SNR can then be defined, at diffraction angles, as:

$$SNR = D_g/(R_g + R_m + \alpha T_g + \beta T_m). \qquad \text{(Equation 1)}$$

When the area 216 of the frame-pixel 200 is populated with an absorptive material, such as absorptive metasurface nanostructures, a component of the reflected light, $R_m$, that would otherwise have been reflected from this area 216 is absorbed, adding to the absorbed component, $A_m$. This reduction in the reflected light component, $R_m$, increases the SNR in accordance with Equation 1.

Therefore populating the unpopulated region 216 with an absorptive material 218, such as metasurface structures, may substantially reduce unwanted specular reflection and the total noise.

For perfect absorbers, $R_m=0$. However, typically the absorbing material 218 is not perfect, and $R_m$ may still contribute to the noise at diffraction angles of individual frame-pixels. Outside the viewing zone of the diffraction orders, diffraction turns off $D_g=0$, and the observer may see only the reflection from the frame-pixel $R_g+R_m$.

Depending on the configuration and application of the passive diffractive display, these reflection terms may be interpreted as signal or noise. For example, as described in more detail below, each frame-pixel may be selectively configured such that the combination of the off-diffraction reflection components, $R_g+R_m$, form a secondary, reflected image.

As noted previously, the absorptive material 218 may be absorptive metastructures. The absorptive metastructures may include, for example, a lattice of plasmonic metasurface structures, made of a plurality of metallic nano-sized scatterers, or a lattice of absorptive HRI metasurface structures, made of a plurality of dielectric scatterers, configured to absorb visible wavelengths. The nano-sized scatterer properties including shape and dimensions may be configured, along with the lattice properties including its basis vectors and periodicity, to tailor the modal dispersion of the electromagnetic wave in interaction with the lattice. The intrinsic material dispersion of the metallic or HRI material used for the absorptive metastructures may be manipulated by modifying the modal dispersion properties.

The lattice may be an ordered plurality of nanostructure unit cells, where the unit cell itself may embed one or several metallic or HRI nanoscatterers. Each nano-scatterer provides a geometry-dependent absorption resonance and introduces a spectral dip in the reflection spectra of the unit cell. By including multiple different nanoscatterers in each unit cell, the spectral dips may combine to provide broadband absorption.

Figure 3A:
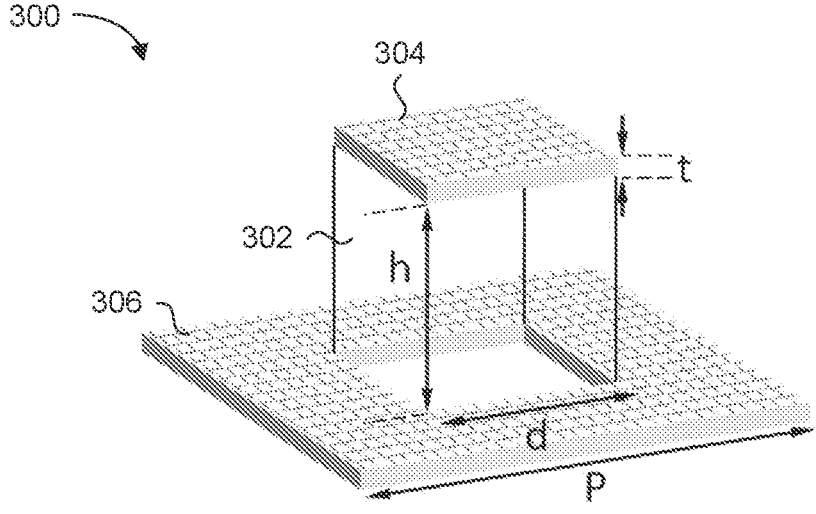
FIG. 3A is a schematic representation of an example of a metasurface structure in accordance with an example of the present disclosure.
Figure 3B:
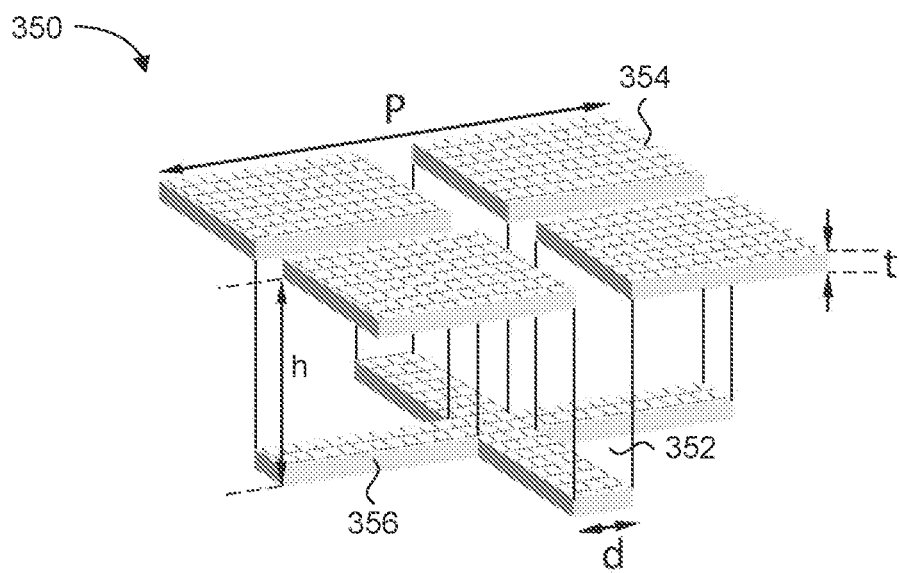
FIG. 3B is a schematic representation of another example of a metasurface structure in accordance with an example of the present disclosure.

FIGS. 3A and 3B each show one example of nanoscatterers. FIG. 3A shows an example of a nano-pillar 300 which may be formed by forming a pillar 302 in a transparent material, then coating the material in a thin metal film, an HRI film, or both a thin metal film and HRI film such that a top coating 304 is formed on top of the pillar 302 and bottom coating 306 is formed on the material surrounding the pillar 302.

FIG. 3B shows an example of a nano-hole 350 which may be formed by forming a trough 352 in a transparent material, then coating the material in a thin metal film, an HRI film, or both a thin metal film and HRI film such that a top coating 354 is formed on the material and bottom coating 356 is formed on the bottom of the trough 352.

Although the pillar 302 shown in the example in FIG. 3A has a square-shaped cross-section, and the trough 352 shown in the example in FIG. 3B has a cross-shaped cross-section, in general the nanostructures may be formed with any shape including, for example, circular, rectangular, triangular, trapezoidal.

The nanostructures, such as the example nano-pillar 300 and nano-hole 350 shown in FIGS. 3A and 3B respectively, may be manufactured using a high-resolution lithography technique, such as, for example, electron beam lithography or nanoimprint lithography, to form the pillars 302 or the troughs 352 in the transparent material. After the lithography is completed, the material may be coated with the thin film material to form the nanoscatterers.

Spectral properties, including the absorption resonances, of metasurface depend on the lattice periodicity, P, or equivalently size of the unit cells (which might be symmetric or asymmetric), size of the nano-scatterers d, height of the nano-scatterers h, and the metal film, or HRI, thickness t.

Including several differently sized nano-scatterers within a single unit cell may produce several absorption resonances leading to broadband absorption resonance. Moreover, the interaction between individual nano-scatterers may give rise to additional absorption resonances and higher absorption.

The passive diffractive displays disclosed herein may operate in a reflective mode of operation in which incident light is directed from above the top surface of the display and is reflected and diffracted away from the display, or in a transmission mode of operation in which incident light is directed from underneath the display and passes through the substrate. In the transmission mode of operation, the light that passes through the substrate is diffracted by the diffractive structures, similar to the reflective mode of operation.

In a reflection mode of operation, metallic coatings may assist with providing a high diffraction efficiency in the diffractive sub-pixels, while the absorptive dispersion of thin metallic films provide absorption characteristics in absorptive sub-pixels. Aluminum and silver films about 30 to about 60 nm thick may be suitable metallic films owing to their excellent optical response in the visible spectrum. Dense, for example P<250 nm, and high-aspect-ratio, e.g., but not limited to, h>200 nm and D<120 nm, metasurfaced nanostructures of both aluminum and silver may provide highly absorptive metasurface sub-pixels. Dielectric materials such as Si with adequate absorption at visible wavelengths can also serve as an acceptable material candidate for the absorptive sub-pixels in the reflective mode.

In a transmission mode of operation, a combination of metallic and dielectric materials may be used to improve the SNR of the display pixels. For example, dielectric films such as Si, TiO2, Nb2O5, and SiN may be used for the diffractive structures of the diffractive sub-pixels whereas Al, Ag, or Ge may be used for the absorptive sub-pixels.

Figure 4:
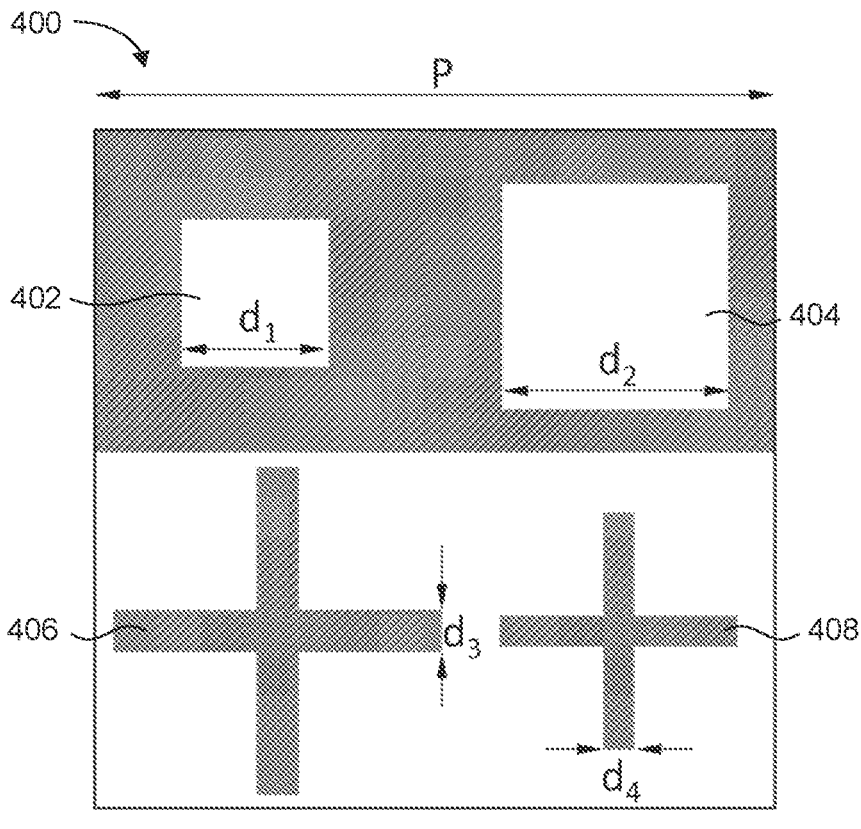
FIG. 4 is a schematic representation of a cross-sectional view of an example unit cell including multiple metasurface structures in accordance with an example of the present disclosure.

FIG. 4 shows a cross-sectional view an example of a unit cell 400 that includes four differently sized and shaped nano-scatters 402, 404, 406, 408. The view shown in FIG. 4 is a top view of a cross-section taken through the transparent material of the unit cell 400, between the top coating and the bottom coating, such that only the bottom coating is shown. The unit cell 400 includes two nano-pillars 402 and 404 that have sizes $d_1$ and $d_2$ respectively, and two nano-holes 406 and 408 that have sizes $d_3$ and $d_4$ respectively.

Figure 5:
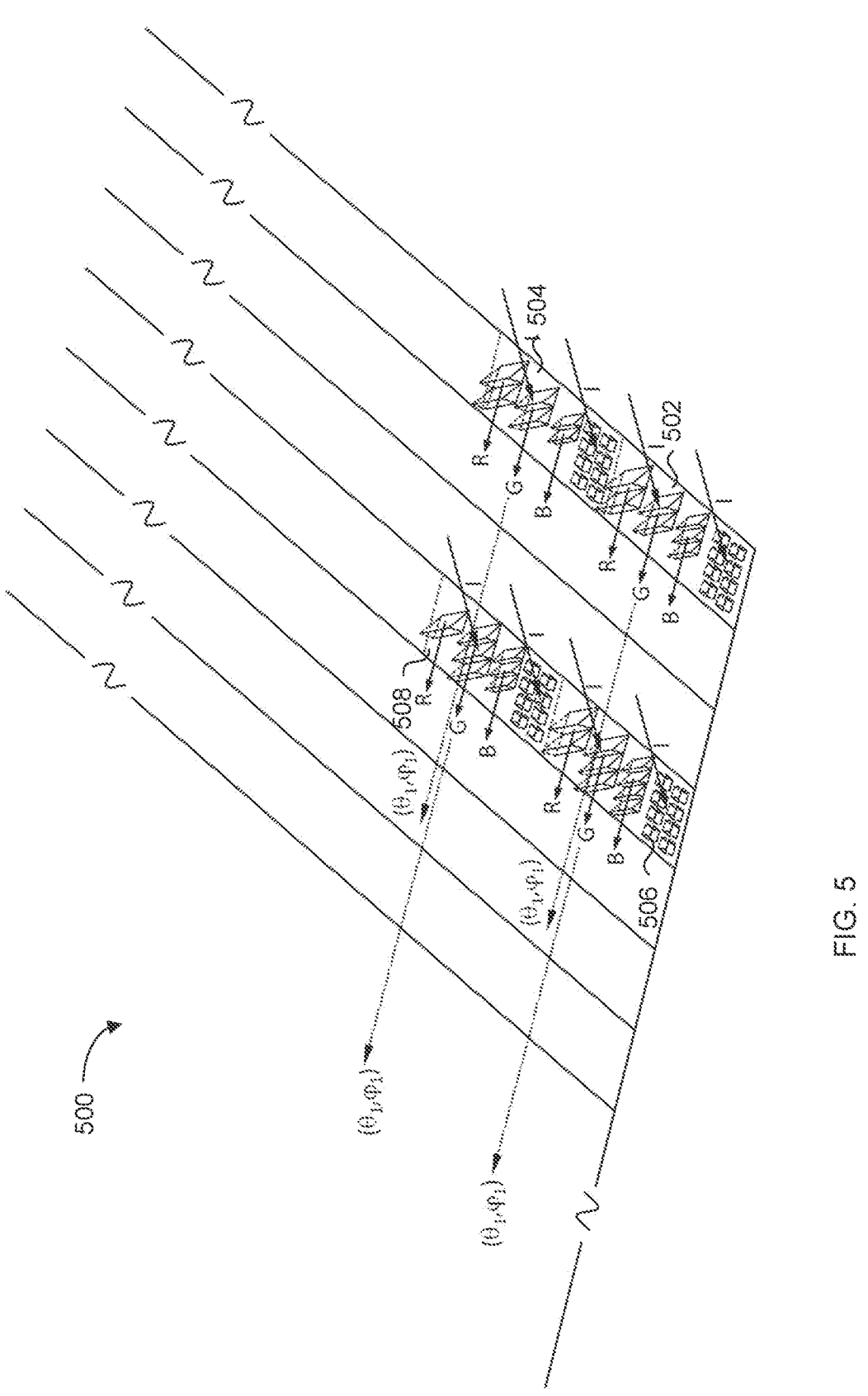
FIG. 5 is a schematic representation of an example portion of a passive diffractive display in accordance with another example of the present disclosure.

A portion 500 of a passive diffractive display is shown in FIG. 5. The example portion shown in FIG. 5 includes four frame-pixels 502, 504, 506, 508 for illustrative purposes. Each of the example frame-pixels 502, 504, 506, 508 shown in FIG. 5 contains sub-pixels of red (R), green (G), and blue (B) diffracting nanostructure gratings, illustrated by the sawtooth pattern, and a sub-pixel populated by a single type of absorptive metasurface nanostructures, illustrated by the arrays of blocks.

The passive diffractive display that includes the example portion 500 shown in FIG. 5 is configured to display a single diffractive image along a viewing angle having a direction defined by $(\theta_1, \varphi_1)$ polar and azimuthal angles, respectively. The diffractive sub-pixels of each of the frame-pixels 502, 504, 506, 508 are configured such that, incident light, indicated by the arrow labelled I in FIG. 5, is diffracted along fundamental diffraction orders, indicated by the arrows labelled R, G, and B in FIG. 5, that are aligned in space along the $(\theta_1, \varphi_1)$ direction and contribute to a single image. The fundamental diffraction orders are aligned by fine-tuning the grating periodicities of the diffractive sub-pixels associated with each frame-pixel 502, 504, 506, 508. Red, green, and blue diffractive sub-pixels of each of the frame-pixels 502, 504, 506, 508 may be weighted in proportion to produce hue, saturation, and brightness values desired that frame-pixel 502, 504, 506, 508. The total filling factor of each frame-pixel 502, 504, 506, 508 may be less 1 unity depending on the pixel's color value resulting in an unpopulated region in the frame-pixels 502, 504, 506, 508.

The absorptive metasurface sub-pixels may populate the entire unpopulated regions of the associated frame-pixel 502, 504, 506, 508 or may partially populate the unpopulated regions of the associated frame-pixel 502, 504, 506, 508 to achieve the desired pixel brightness level and the SNR in combination with the diffractive sub-pixels.

In some examples, the absorptive material in the absorptive sub-pixels may be configured such that, at angles spaced away from the direction of the fundamental diffractive orders, referred to herein as "off-diffraction angles", a stationary image is produced by the absorptive sub-pixels. An image viewable at the off-diffraction angle may be referred to herein as a reflective image, while an image formed by the diffractive structures along the direction of the fundamental orders of diffraction may be referred to herein as a diffractive image. The image formed by the absorption sub-pixels at off-diffraction angles may be a secondary application of the passive diffractive displays disclosed herein that may be employed, for example, as an additional authentication feature to surface applied security holograms.

Figures 6A, 6B, 6C, 6D:
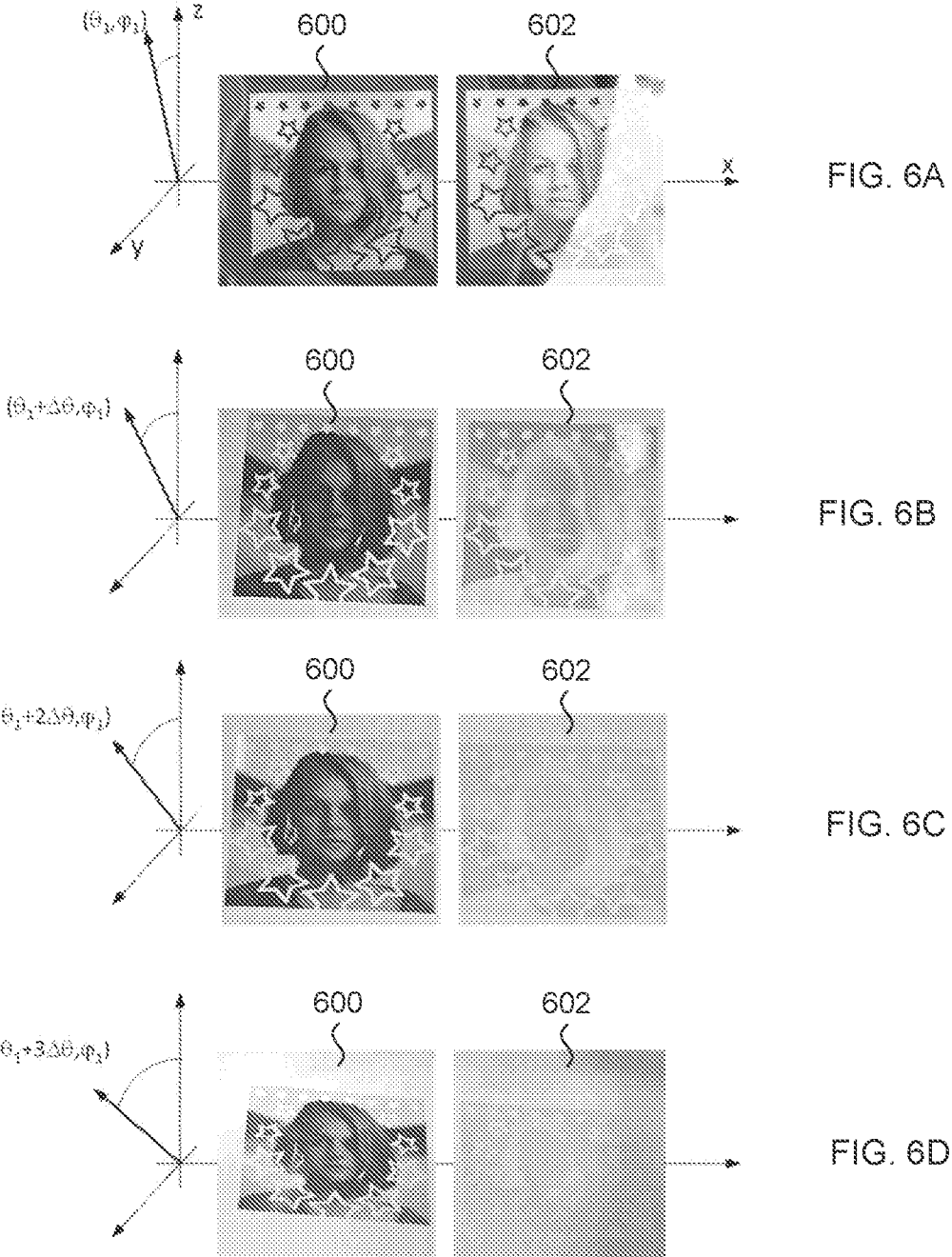
FIG. 6A is a photographic representation of two example passive diffractive displays at different viewing angles, one passive diffractive display including absorptive sub-pixels in accordance with examples of the present disclosure.
FIG. 6B is a photographic representation of the two example passive diffractive displays at different viewing angles, one passive diffractive display including absorptive sub-pixels in accordance with examples of the present disclosure.
FIG. 6C is a photographic representation of the two example passive diffractive displays at different viewing angles, one passive diffractive display including absorptive sub-pixels in accordance with examples of the present disclosure.
FIG. 6D is a photographic representation of the two example passive diffractive displays at different viewing angles, one passive diffractive display including absorptive sub-pixels in accordance with examples of the present disclosure.

Photographs of a passive diffractive display 600 that includes absorption sub-pixels in accordance with the present disclosure and a passive diffractive display 602 that does not include absorption sub-pixels are compared in FIGS. 6A-6C. The absorptive material utilized in the passive diffractive display 600 shown in FIGS. 6A to 6D includes metasurface structures configured to be highly absorptive in the visible range of spectrum, leading to dark sub-pixels at off-diffraction angles. For example, the metasurface structures in the absorption sub-pixel may be configured to provide a RGB code darker than RGB=[50, 50, 50], or equivalently a luminance of lower than 47, or to provide 80-90% absorption in the visible range of the spectrum.

Both display 600 and 602 present a true-color image, although FIGS. 6A to 6D are shown in grey-scale, at the diffraction angle of the fundamental diffraction order $(\theta_1, \varphi_1)$ as shown in FIG. 6A. As shown in FIG. 6A, the image displayed by display 600 shows higher visual contrast at the diffraction angle compared to the image displayed by display 602 due to the elevated SNR. Both displays 600 and 602 are rotated with $\Delta\theta$ increments of the polar angle where diffraction turns off at $\theta_1 + \Delta\theta$, as shown in FIG. 6B, and angled beyond that, i.e. at angles $\theta_1 + 2\Delta\theta$ and $\theta_1 + 3\Delta\theta$ as shown in FIGS. 6C and 6D. At the off-diffraction angles shown in FIGS. 6B to 6C, the regular diffractive image disappears, and the reflection of the metallic foil is predominantly seen by the observer in the display 602, whereas display 602 displays a grayscale static image enabled by dark absorbing sub-pixels.

In passive displays, the secondary image due to the absorptive sub-pixels that appears at off-diffraction angles may be a multicolor image itself depending on the number and combination of metasurface structures embedded within the absorptive sub-pixel.

Figure 7:
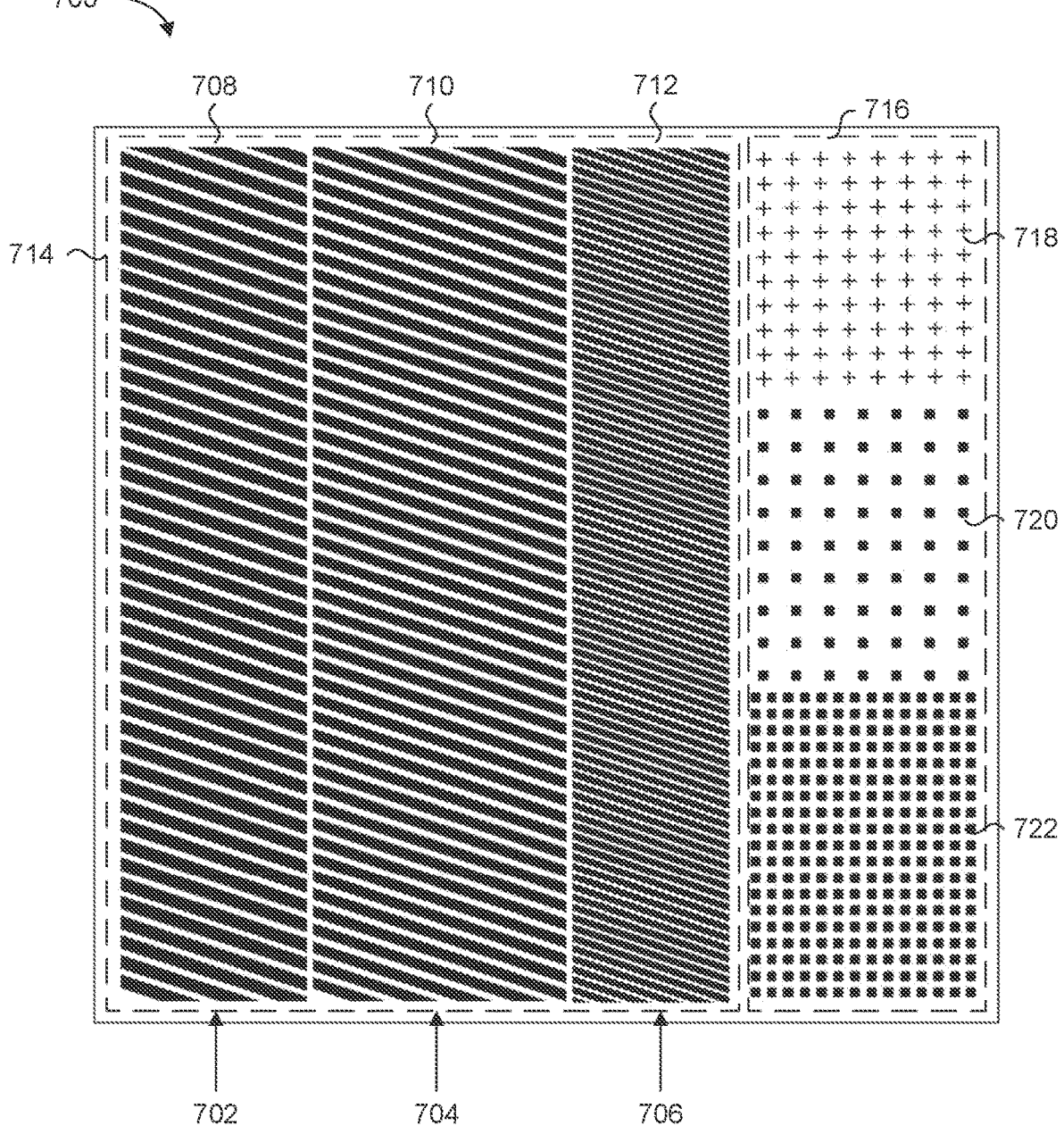
FIG. 7 is a schematic representation of an example a frame-pixel of a passive diffractive display according to another example of the present disclosure.

An example frame-pixel 700 that is configured to display a multicolor image at off-diffraction angles by including multiple different types of absorptive materials in the region of the frame-pixel that is not occupied by diffractive elements is shown in FIG. 7.

The example frame-pixel 700 includes three sub-pixels 702, 704, and 706 that are each respectively associated with, for example, the R, G, B color bases, and each include respective diffractive structures 708, 710, and 712. The sub-pixels 702, 704, and 706 and their respective diffractive structures 708, 710, and 712 may be substantially similar to the sub-pixels 202, 204, and 206 and the diffractive structures 208, 210, and 212 of the example frame-pixel 200, described previously, and therefore are not described in more detail here. The three sets of diffractive structures 708, 710, and 712 of the sub-pixels 702, 704, and 706 populate a first region 714 of the frame-pixel 700. Although the example frame-pixel 700 shown in FIG. 7 includes R, G, and B color bases, other examples the region 714 may be populated with sub-pixels based on any suitable color basis.

Similar to the unpopulated region 216 of the example frame-pixel 200 described previously with reference to FIG. 2, the example frame-pixel 700 includes an unpopulated region 716 that includes an absorptive material. However, unlike the absorptive material 218 of the example frame-pixel 200 described previously which may include a single type of absorptive material 218 with broadband absorptivity, the region 716 of frame-pixel 700 includes three different types of metastructures 718, 720, 722. The absorptive band of each of the metastructures 718, 720, 722 is configured such that each of the metastructures 718, 720, 722 reflects a different band of visible light, and the size of the each of the metastructures 718, 720, 722 is chosen such that the light reflected from the metastructures 718, 720, 722 and the diffractive structures 708, 710, and 712 provides a desired hue and brightness at off-diffraction angles. In this manner, the metastructures 718, 720, 722 forms metasurface color sub-pixels.

The weighting factor of R, G, B sub-pixels 702, 704, 706 may be properly adjusted in correspondence with the color value of the metastructures 718, 720, 722 such that the total color value of frame-pixel 700 at the viewing angle, which is due to the color value of the light diffracted from the diffractive structures 708, 710, 712 and the color value of the light reflected from the metastructures 718, 720, 722, forms the desired true-color image at the viewing angle. Although the above configuration is discussed in the reflective mode of operation, the concept for providing a multicolor image at off-diffraction angles may be extended to a transmission mode of operation as well.

Although the previously described examples all relate to passive diffractive displays that display a single image at a viewing angle associated with the direction of the fundamental diffraction orders of the diffractive structures, these examples can be extended to a passive diffractive device that displaying multiple images, each image displayed at a different viewing angle. The multiple images may relate to an animation sequence that provides the effect of a moving image as the viewer moves through different viewing angles. Alternatively, the multiple images may relate to different perspective views of a 3D object to provide the effect of viewing a 3D object as the viewer moves through different viewing angles. Alternatively, or additionally to any of the previous two examples, the multiple images may be the same static image such that the static image is viewable at multiple different viewing angles in order to increase the viewing zone of the static image. In order to display multiple images at different viewing angles, each pixel, referred to herein as a micro-pixel, of the passive diffractive display includes multiple frame-pixels; one frame-pixel associated with each of the multiple images displayed by the display.

Figure 8:
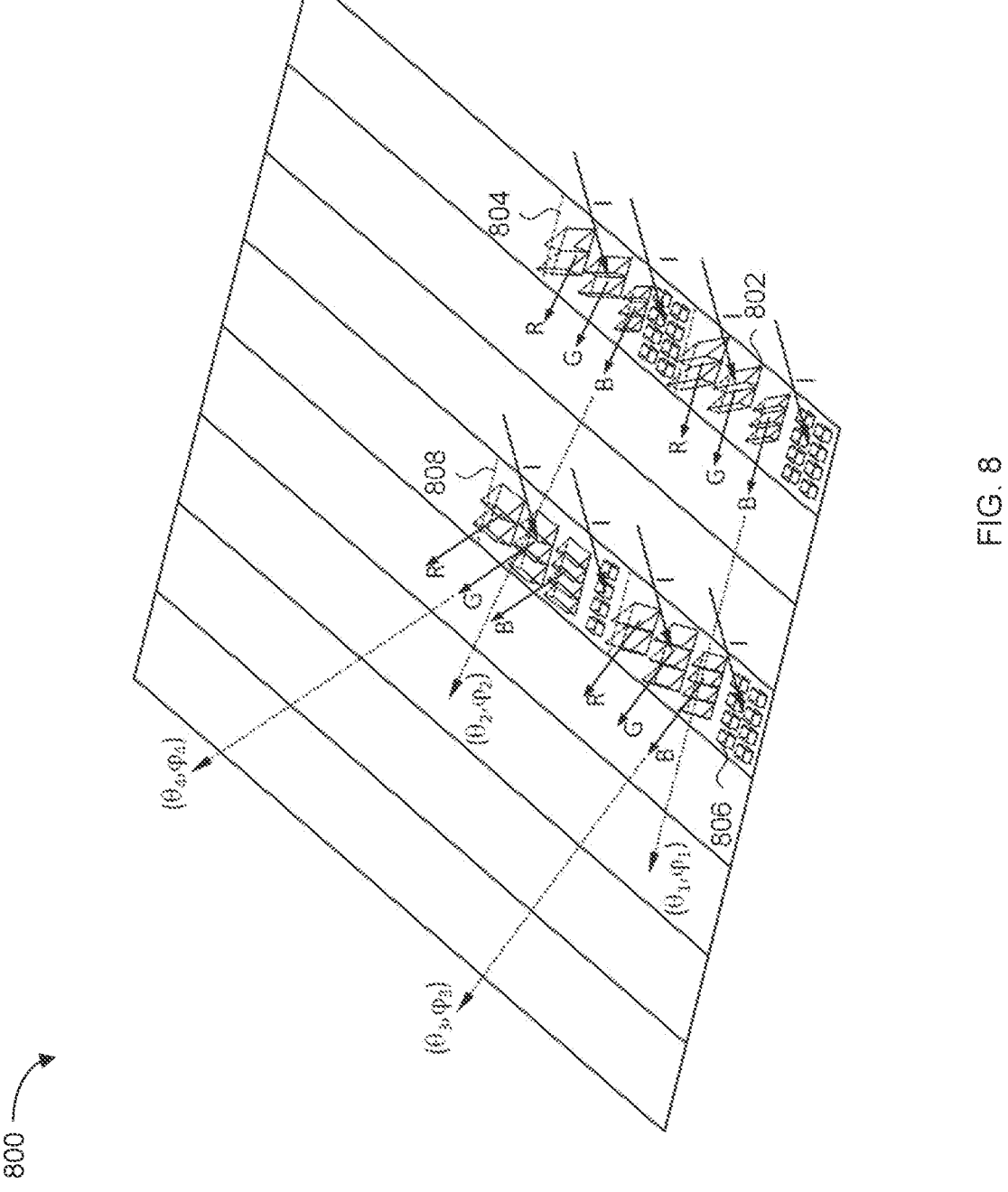
FIG. 8 is a schematic representation of an example micro-pixel according an example of the present disclosure.

An example of a micro-pixel 800 of passive diffractive display is shown in FIG. 8 that is, for illustrative purposes only, shown configured to display at least four images at four different viewing angles: $(\theta_1, \varphi_1)$, $(\theta_2, \varphi_2)$, $(\theta_3, \varphi_3)$, and $(\theta_4, \varphi_4)$. The example micro-pixel 800 shown in FIG. 8 includes four frame-pixels, 802, 804, 806, and 808, each sub-pixels associated with a respective one of the four images displayed by the passive diffractive display. The micro-pixel 800 is shown with only four frame-pixels for illustrative purposes only, and in practice the micro-pixel may be populated with many more than four frame-pixels such that, for example, the other portions of the micro-pixel 800 may similarly include additional, differently oriented frame-pixels having viewing angles different than $(\theta_1, \varphi_1)$, $(\theta_2, \varphi_2)$, $(\theta_3, \varphi_3)$, and $(\theta_4, \varphi_4)$.

Similar to the example portion 500 described previously with reference to FIG. 5, each of the frame pixels 802, 804, 806, and 808 contains sub-pixels of red (R), green (G), and blue (B) diffracting nanostructure gratings, illustrated by the sawtooth pattern, and a sub-pixel populated by a single type of absorptive metasurface nanostructures, illustrated by the arrays of blocks. However, unlike the portion 500 described previously, for each frame-pixel 802, 804, 806, and 808, the diffractive sub-pixels are configured to have a directions of the fundamental order of diffraction, indicated by the arrows labelled R, G, and B in FIG. 8, along a respective one of the four viewing angles, $(\theta_1, \varphi_1)$, $(\theta_2, \varphi_2)$, $(\theta_3, \varphi_3)$, and $(\theta_4, \varphi_4)$ for incident light, indicated by the arrow labelled I in FIG. 8. Each micro-pixel of the passive diffractive display would, similar to the micro-pixel 800, include four frame-pixels having diffractive sub-pixels configured with directions of the fundamental order of diffraction along a respective one of the four viewing angles, $(\theta_1,\varphi_1)$, $(\theta_2,\varphi_2)$, $(\theta_3,\varphi_3)$, and $(\theta_4,\varphi_4)$ in order to form the four images along these four viewing angles.

The absorptive material included in any of the absorptive sub-pixels of the frame-pixels 802, 804, 806, and 808 may be any suitable absorptive material as described previously, including absorptive metasurfaces. The absorptive sub-pixels may further be configured such that a static image is displayed at off-diffraction angles, either a mono-color static image or a multicolor static image, as described previously. The static images may be used, for example, for authentication purposes as described above or for combining a static content beyond the viewable zone of the dynamic content provided by the multiple images viewable at different viewing angles.

In another example of a passive diffractive display configured to display multiple images at different viewing angles, the micro-pixels of the display may an underlying microstructure with a 3D surface providing angled micro-facets on which the frame-pixels are arranged. The angled micro-facets are provided increase the viewing zone of the diffractive display or to display multi-axis parallax effects compared to a passive diffractive display that includes flat micro-pixels.

Figure 9:
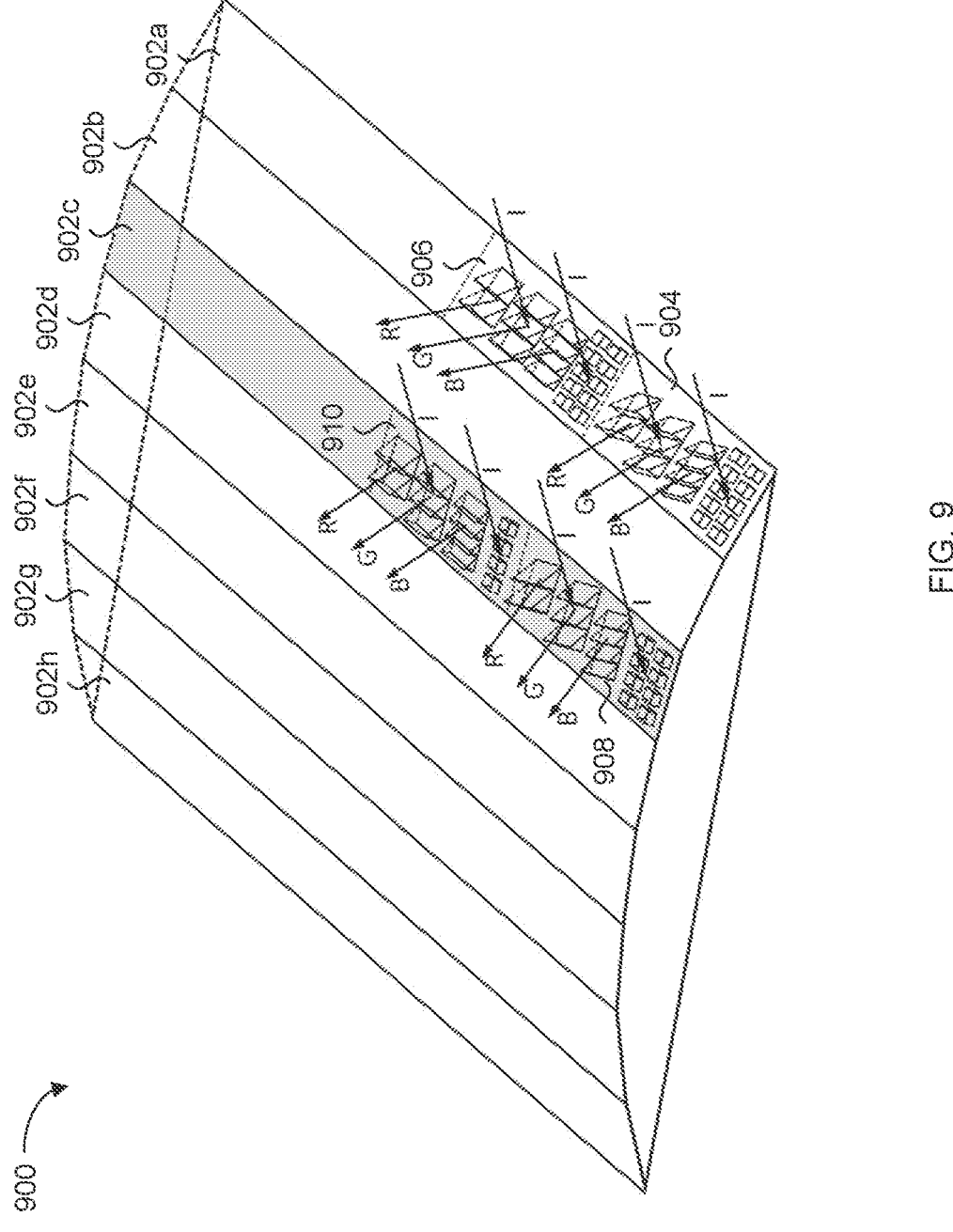
FIG. 9 is a schematic representation of an example micro-pixel according to another example of the present disclosure.

An example micro-pixel 900 of a passive diffractive display having a 3D cylindrically shaped surface is shown in FIG. 9. The 3D surface of the example micro-pixel 900 forms eight rectangular-shaped micro-facets 902a to 902h arranged around the cylindrically shaped surface such that the surface normals of each of the micro-facets 902a to 902h are non-parallel, varying in the azimuthal angle component but having generally the same polar angle components. Although a cylindrical surface is shown in the example of FIG. 9, in practice any suitable surface may be utilized such that at least some of the micro-facets have surface normals that are non-parallel, including, for example, micro-cylinders, micro-pyramids, micro-domes, bi-facets, and quadra-facets.

Each of the micro-facets 902a to 902h of the micro-pixel 900 functions as a micro-reflector that independently reflects an incident light beam toward different orientations in space due to the non-parallel surface normals of the micro-facets. The micro-facets 902a to 902h may each include one or more frame-pixels. In the example micro-pixel 900 shown in FIG. 9, four frame pixels 904, 906, 908, and 910 are shown, each frame-pixels being associated with a respective one of four images viewable at a respective unique viewing angle.

Similar to the micro-pixel 800 described previously with reference to FIG. 8, each of the frame pixels 904, 906, 908, and 910 contains sub-pixels of red (R), green (G), and blue (B) diffracting nanostructure gratings, illustrated by the sawtooth pattern, and a sub-pixel populated by a single type of absorptive metasurface nanostructures, illustrated by the arrays of blocks, where the diffractive sub-pixels are configured to have a directions of the fundamental order of diffraction, indicated by the arrows labelled R, G, and B in FIG. 8, along the viewing angles of the image that the frame-pixel 904, 906, 908, and 910 is associated with.

In the cylindrically shaped micro-pixel 900 example shown in FIG. 9, the azimuthal angle of the fundamental diffraction order of the diffractive sub-pixels is substantially determined by the azimuthal angle of the surface normal of the micro-facet 902a to 902h on which the diffractive sub-pixels reside, whereas the polar angle of the fundamental diffraction orders is determined by both the polar angle of the surface normal micro-facet 902a to 902h and the periodicity of the diffractive structures of the diffractive sub-pixels. In this way, frame-pixels of a single micro-facet 902a to 902h have viewing angles at substantially the same azimuthal angle, but different polar angles such that as a user views the display through different polar angles along the same azimuthal angles, images associate with the frame-pixels of a single micro-facet 902a to 902h, such as frame-pixels 904 and 906 of micro-facet 902a or frame-pixels 908 and 910 of micro-pixel 902c, are viewed in succession.

The configuration illustrated by the micro-pixel 900 facilitates constructing a passive diffractive display that displays a set of animation frames, where navigating through different micro-facets 902a to 902h by changing the azimuthal angle at which the display is viewed, causes the same image to be displayed, whereas changing the polar angle at which the display is viewed causes an animation sequence to be viewed. This effectively increases the viewing zone along the azimuthal direction at which the animation sequence is viewable. In other examples, the passive diffractive display incorporating micro-pixels 900 may be configured to display different perspectives of the same animation at viewing angles that differ in azimuthal angle, or an entirely different animation sequence to be displayed at viewing angles that differ in azimuthal angle.

When viewing a diffracted image from a passive diffractive display having micro-pixels with 3D surfaces forming micro-facets, such as the example micro-pixel 900 shown in FIG. 9, at a viewing angle associated with a frame-pixel of a particular micro-facet, the diffractive sub-pixels arranged on neighboring micro-facets should desirably be "off" such that light diffracted from these diffractive sub-pixels does not contribute to the diffracted light forming the diffracted image viewed at the viewing angle. However, the cross-noise received from the neighboring micro-facets may obstruct the diffraction signal from the desired frame-pixel. The cross-noise may be especially more enhanced in a 3D-profiled micro-pixel, such as the example micro-pixel 900 shown in FIG. 9, compared to a flat micro-pixel, such as the example micro-pixel 800 shown in FIG. 8, because the differently angled micro-facets increase the possibility of receiving specular reflection from any of the neighboring facets, particularly in a multi-light-source environment. The application of absorptive sub-pixels, which may include absorptive metastructures, may substantially assist with reduction of the cross-noise reducing reflection from the frame-pixel, which reduces noise when viewing the display at viewing angles associated with neighboring frame-pixels and by absorbing reflection from neighboring frame-pixels that may be scattered within the display stack.

In the example of a micro-pixel having 3D multi-facets, such as the example micro-pixel 900, the absorptive sub-pixels may be configured such that that an independent multi-color animation is displayed outside the viewing zones of the diffractive animation. In this case, the frame-pixels may include absorptive sub-pixels having different types of metastructures, similar to the example frame-pixel 700 described previously with reference to FIG. 7, that may be weighted properly to display a single frame or a single perspective of the multi-color reflected animation at a viewing angle determined by the surface normal of the facet 902a to 902h that the frame-pixel is located. As the observer navigates through viewing angles associated with different facets 902a to 902h, the other reflective frames of the multi-color animation is displayed. In such configuration, the direction of the fundamental diffraction orders of the diffractive sub-pixels that provide the diffracted images of the animation sequence are in a different direction to the viewing angles of the reflected images formed by the absorptive sub-pixels such that the diffractive animation images don't interfere with the reflective animation images.

In contrast to the diffracted images formed by the diffractive sub-pixels, which are only visible within a relatively narrow zone around the viewing angle, the viewability of metastructured sub-pixels may be substantially omnidirectional, meaning that the metastructures of the color shift of the light reflected by the absorption sub-pixels with viewing angle is small. This means an observer is able to see the multi-color reflected animation on a wider viewing zone, whereas the diffractive animation images appear only within a smaller viewing zone overlapped with the reflected viewing zone.

This overlaps may result in the diffractive animation images being modulated on the reflected animation images in the overlapped zone. As a result, the weighting and filling factor of the diffractive and absorptive sub-pixels may be fine-tuned to adjust the visibility of either of the diffractive or reflective animation images up or down within the overlapped viewing zone. For example, the diffractive animation images can be implemented by configuring the diffractive sub-pixels with higher filling factors compared to the absorptive sub-pixels so that the brightness and visibility of the diffractive animation images become dominant compared to the reflective animation images within the overlapped viewing zone. Outside the overlapped viewing zone, the diffracted light components may be unnoticeable compared to the reflected light component from the absorptive sub-pixels, and the observer is able to see the reflective animation images produced by the absorptive sub-pixels overlaid on different facets.

Different stages of an example method for fabricating passive diffractive displays that include micro-pixels having 3D micro-facets similar to the micro-pixel 900 shown in FIG. 9 are delineated in FIGS. 10A-10F.

Figures 10A, 10B, 10C, 10D, 10E, 10F:
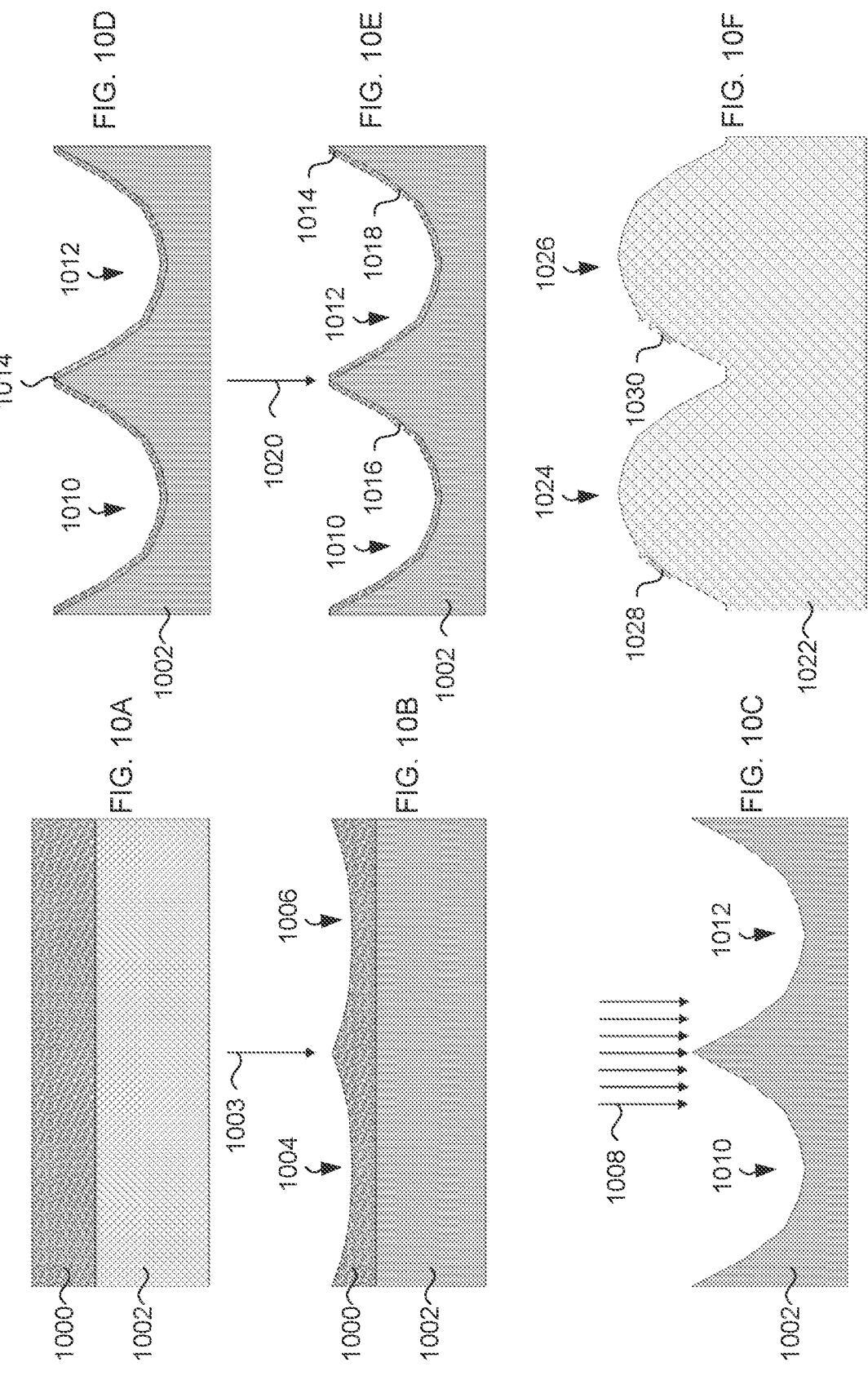
FIG. 10A is a schematic representation of a cross-sectional view illustrating a step in an example process for manufacturing a passive diffractive display according to examples of the present disclosure.
FIG. 10B is a schematic representation of a cross-sectional view illustrating another step in the example process for manufacturing a passive diffractive display according to examples of the present disclosure.
FIG. 10C is a schematic representation of a cross-sectional view illustrating a further step in the example process for manufacturing a passive diffractive display according to examples of the present disclosure.
FIG. 10D is a schematic representation of a cross-sectional view illustrating yet another step in the example process for manufacturing a passive diffractive display according to examples of the present disclosure.
FIG. 10E is a schematic representation of a cross-sectional view illustrating a further step in the example process for manufacturing a passive diffractive display according to examples of the present disclosure.
FIG. 10F is a schematic representation of a cross-sectional view illustrating yet a further step in the example process for manufacturing a passive diffractive display according to examples of the present disclosure.

FIG. 10A shows a first step of forming the micro-pixels in a layer 1000 of e-beam resist material was spin-coated onto a silicon wafer substrate 1002. Although the substrate 1002 in the example process described here is silicon, other hard substrates such as quartz may also be micro-patterned using the lithography process described below. The thickness of the e-beam resist layer 1000 may be approximately 2 μm, and may be fine-tuned to provide a desired contrast curve. The contrast curve of the e-beam resist layer 1000 may be measured for a specific desired e-beam energy, such as for example 50 kV, e-beam size and depth of focus, and the subsequent production steps may be accomplished with those same e-beam lithography conditions. The surface profiles of desired 3D structures of the micro-pixels may be approximated with piecewise linear approximation as a part of implementing the grey-scale e-beam lithography technique. The surface area of the 3D structures may be discretized into rectangular divisions with differently modulated resist heights. A correction mechanism accounting for the electron forward scattering and backscattering effects, known as proximity effect correction, may be algorithmically implemented in order to deliver a desired amount of total electron energy to each division.

Referring to FIG. 10B, a second step is shown in which e-beam lithography, as indicated by the arrow 1003, is utilized to form 3D structures 1004, 1006 in the e-beam resist layer 1000. After e-beam lithography, the resist layer 1000 may be chemically developed to remove exposed regions and form the 3D structures 1004, 1006 on the surface of the e-beam resist layer 1000.

Referring to FIG. 10C, a third step is shown in which dry etching, indicated by the arrow 1008, is performed to transfer the pattern of 3D microstructures 1004, 1006 in the e-beam resist layer 1000 onto the underlying substrate 1002 to form final microstructures 1010, 1012. The microstructures 1010, 1012 shown in FIG. 10C may be utilised to form concave-shaped micro-pixels including facets. However, in other examples the processed described here may be utilized to form microstructures 1010, 1012 that are shaped to form micro-pixels having any suitable shape such as those shapes described previously, such as the cylindrically-shaped example micro-pixel 900 shown in FIG. 9.

A dry reactive ion etching technique may be utilized as the dry etching technique to form the microstructures 1004, 1006 shown in FIG. 10C. The etching selectivity, defined as the ratio between the etch rate of the e-beam resist layer 1000 and the etch rate of the substrate 1002, determines the depth of the final microstructures 1010, 1012 engraved into the underlying substrate 1002. In an example, a depth of about 5 to about 9 μm for the microstructures 1010, 1012 may be desired for proper optical rendering. For a silicon substrate, a combination of fluorine-based etching gases including $CHF_3$ and $SF_6$ along with $O_2$ may be utilized. $CHF_3$ and $SF_6$ may be utilized for surface passivation and etching, respectively, of the silicon substrate 1002, and $O_2$ may be utilized to fine-tune the resist etch rate and thus the etch selectivity.

After the microstructures 1010, 1012 are formed, a thin layer 1014 of e-beam resist is formed on the surface of dry etched microstructures 1010, 1012 as shown in FIG. 10D. The layer 1014 of e-beam resist is used to form nanostructures using a subsequent e-beam lithography process as described in more detail below. A dry coating process may be used to provide the layer 1014 by conformally transferring the thin e-beam resist layer 1014 onto the microstructures 1010, 1012. First, a polydimethylsiloxane (PDMS) coated carrier wafer may be $O_2$ plasma treated and spin coated with a layer of e-beam resist of a desired thickness. Second, the spun e-beam resist may be transferred onto the micro-patterned substrate 1002 by bringing the faces of the coated carrier wafer and the substrate 1002 into close contact under high mechanical pressure and under applied heating in vacuum. Third, the carrier wafer may be detached from the substrate 1002 such that the e-beam resist is transferred from the carrier wafer to the substrate 1002, conformally coating with the thin layer 1014 of e-beam resist.

Referring now to FIG. 10E, after the microstructures 1010, 1012 are coated with the layer 1014 of e-beam resist, grey-scale e-beam lithography, indicated by the arrow 1020, is utilized to lay out the image on the microstructures 1010, 1012 respectively, made by the nanostructures 1016, 1018 formed in the e-beam resist layer 1014. As described later, the nanostructures 1016, 1018 are utilized to form the diffractive and metasurface structures on the micro-pixels that formed from the microstructures 1010, 1012. For illustrative purposes, FIG. 10E includes only two nanostructures 1016, 1018, one on each of the two microstructures 1010, 1012 respectively. However, in practice, any number of microstructures 1010, 1012 may be included on the substrate 1002, with each microstructure 1010, 1012 including any number of nanostructures 1016, 1018 which form any number of frame-pixels such that a diffractive display formed using the microstructures 1010, 1012 displays any number of desired images, as described previously. Major part of the proximity effect may be algorithmically corrected to minimize the electron scattering effects. Proximity effect is caused by some portion of the electrons during e-beam lithography passing through the resist layer and being scattered back into the resist layer from the substrate which re-exposes the resist material. The scattered electrons may cause extra exposure of the resist (more than intended). On option for modelling the proximity effect is utilizing Monte-Carlo algorithms that calculate the electrons trajectory back into the resist layer after hitting the substrate material, which may be utilized to quantify the over-exposure quantitatively. Once the over-exposure is modelled, the energy of the initial electrons can be fine-tuned to minimize the scattering from the substrate, and therefore the proximity effect.

After the nanostructures 1016, 1018 are formed, the layer 1014 of e-beam resist may be chemically developed and dehydrated using, for example, a gentle thermal reflow process, which may also result smoothening the diffractive and metasurface nanostructures. Smoothening facilitates the subsequent replication processes, which is described in more detail below with reference to FIG. 10F, once the master stamp is made by removing sharp edges and small details of the nanostructures that may create problems during the demolding process.

Referring now to FIG. 10F, after nanostructures 1016, 1018 are formed and the layer 1014 is chemically developed, the substrate 1002 may be utilized to produce a mold 1022 that may be utilized for pattern replicating a passive diffractive display that includes microstructures 1010, 1012 having nanostructures 1016, 1018 utilizing using nanoimprinting. The example mold 1022 includes microstructures 1024, 1026 that correspond to microstructures 1012, 1010, respectively, and nanostructures 1028, 1030 that correspond to nanostructures 1018, 1016, respectively. In an example, the mold 1022 may be formed of nickel or any other suitable material.

The mold 1022 includes the reverse of the desired image such that the mold 1022 may be stamped onto a material formed from, for example, ultra-violet (UV) or thermal resin to replicate by mechanical deformation the pattern of microstructures 1010, 1012 and nanostructures 1016, 1018 included on the substrate 1002.

To fabricate the mold 1022 using nickel, a thin film seed layer (not shown) of nickel may be conformably deposited on the nano-patterned layer 1014 e-beam resist shown in FIG. 10E. Physical vapor deposition with sputtering techniques may be employed to obtain conformal coating of the nickel seed layer and the film thickness may be kept between 50 to 100 nm to avoid developing a high stress thin film and deforming the resist. Once the seed layer is successfully coated, the stack of the micro-patterned substrate 1002, nano-patterned layer 1014, and the conformably coated seed layer, may be transferred to an electroplating bath where the nickel mold 1022 is developed by electroforming.

Once formed, mold 1022 is used to replicate the structure of nanostructures 1016, 1018 in resin (e.g., but not limited to, UV curable resin or thermal resin) using an imprinting process. A conformal functionalizing layer is formed on top of the molded resin surface. Depending on the implementation, the functionalizing layer can be a metallic layer or a HRI dielectric layer. Additional layers can applied on either side of the functionalized resin layer in order to form a diffractive display that can be transferred to a carrier substrate, such as a banknote or credit card.

Figure 11:
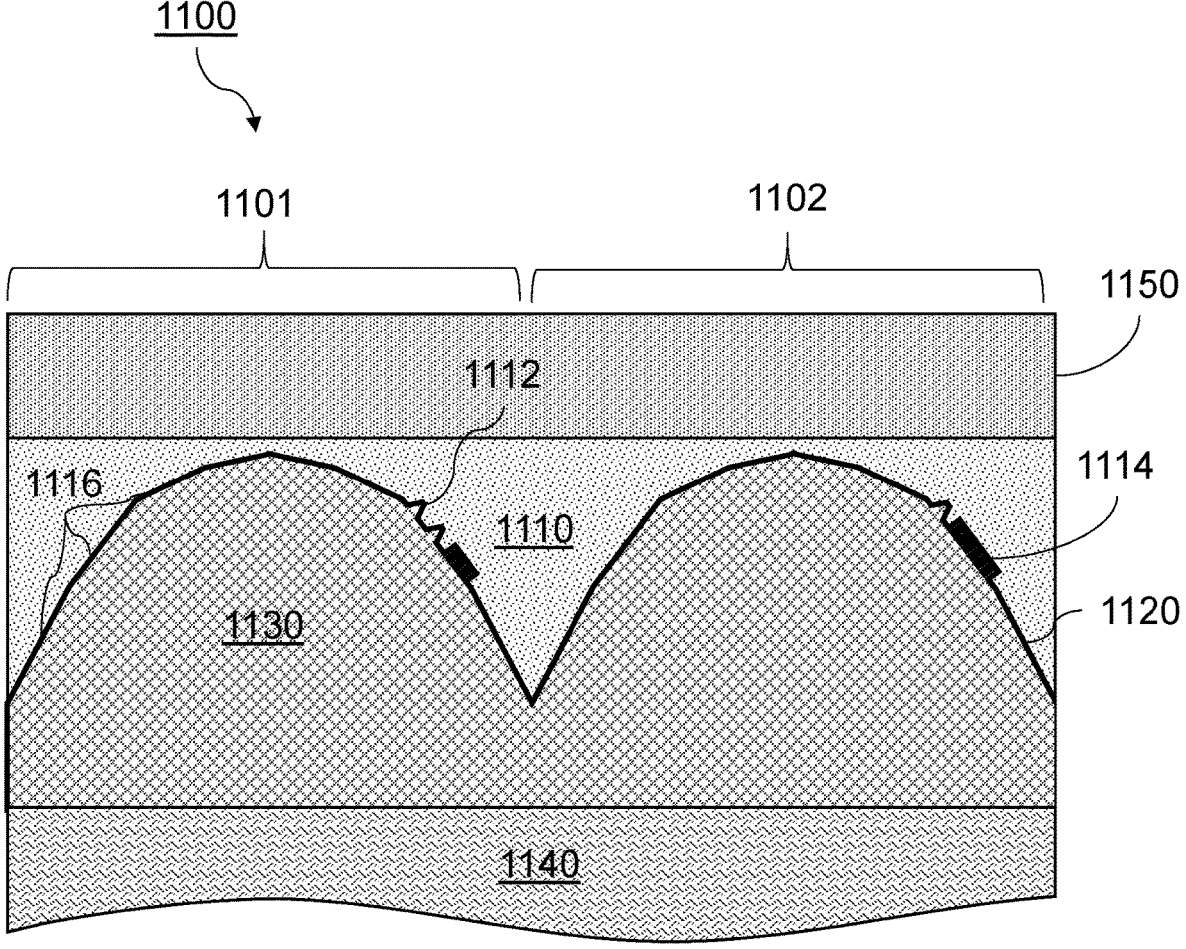
FIG. 11 is a schematic representation of a cross-sectional view of an example passive diffractive display according to examples of the present disclosure.

An exemplary diffractive display 1100 made using mold 1022 is delineated in FIG. 11. Two pixels, 1101 and 1102, are shown in cross-section. Display 1100 includes a molded resin layer 1110 that includes a patterned surface that includes multiple facets 1116. The facets 1116 of each pixel 1101 and 1102 have different orientations. The facets 1116 include gratings 1112 and/or metastructures 1114. A functionalizing layer 1120 coats the patterned surface of the resin layer 1110. The structured surface of the molded resin layer 1110 is affixed to a substrate 1140 by an adhesive layer 1130, which fills the trenches defined by the patterned surface and functionalizing layer 1120. The functionalizing layer 1120 can, in some cases, be a metallic layer. In other cases, the functionalizing layer 1120 can be a HRI dielectric layer (e.g., but not limited to, with absorption loss at visible wavelengths). A protective layer 1150 (e.g., but not limited to, a hardcoat) is disposed on the surface of the molded resin layer 1110 opposite the metallic layer 1120.

Molded resin layer 1110 can be formed from a UV-curable resin or a thermal resin. The thickness of the molded resin layer 1110 can be about 20 microns or less (e.g., but not limited to, about 15 microns or less, about 10 microns or less, about 8 microns or less, about 5 microns or less, such as about 3 microns), Certain facets 1116 feature gratings 1112. The periodicity of the gratings 112 can vary depending on the implementation. Gratings 1112 can have a period in a range from about 300 nm to about 700 nm, for example. The gratings can be reflective gratings. The gratings can be blazed gratings. Examples of suitable gratings are described in WO2022130346A1

Some facets 1116 feature metastructures 1114 are composed of structures with a periodicity lower than the diffraction limit for visible light, such as less than about 280 nm. The metastructures 1114 can have a lateral dimension, d, that is in a range from about 60 nm to about 30 nm less than the periodicity. Generally, the shape of the metastructures 1114 can be cross-shaped, square, cone-shaped, dome-shaped, circular, hexagonal, or triangular. Here, the shape refers to the lateral shape viewed normal to the facet on which the metastructures are located. The shape of metastructures 1114 may be different depending on the composition of the functionalizing layer 1120, e.g., but not limited to, the shape can be selected depending on whether the functionalizing layer is metallic or dielectric.

The thickness of the nanostructures composing gratings 1112 and/or metastructures 1114 can be in a range from about 50 nm to about 300 nm. The thickness of nanoimprinted pillars or holes can be determined based on various factors, such as: (i) the interplay of plasmonic (Mie resonances) in plasmonic (dielectric) metasurfaces; and/or (ii) the manufacturing complexities associated with nanoimprinting lithography of high-aspect-ratio holes or pillars.

In each case, the shape, dimensions, and/or composition of the metastructures 1114 can be determined empirically and/or using computer simulations.

As noted above, the functionalizing layer 1120 can be a metallic layer or a HRI dielectric layer. Suitable metallic layers can be formed from Al, Ag, Au, Ni, Cr, or mixtures thereof. For metallic layers, the thickness is about 50 nm or less (e.g., but not limited to, about 40 nm or less, about 30 nm or less). The thickness should be appropriate to localize plasmonic resonances. For HRI dielectric layers, thickness can be in a range from about 50 nm to about 200 nm. The thickness should be appropriate to form Mie resonances. The HRI material used for this layer should exhibit an absorption loss for visible wavelengths. In some cases, Si or Ge is used for the functionalizing layer 1120.

Adhesive layer 1130 can be composed of a water-based pressure sensitive adhesive, a latent reactive adhesive, or a thermoplastic adhesive film, for example. The adhesive layer has a thickness in a range from about 5 microns to about 15 microns. The layer can include a primer to facilitate adhesive to the resin layer 1110 and/or to substrate 1140. The thickness of the primer can be in a range from about 3 microns to about 6 microns.

A variety of different substrates can be used for substrate 1140, depending on the implementation. In some examples, the substrate can be a banknote (e.g., but not limited to, a paper or polymer banknote). In some cases, the substrate can be a plastic substrate, such as a credit card or ID card. The thickness of the substrate 1140 can vary depending on the implementation. Banknotes, for example, can have a thickness in a range from about 75 microns to about 100 microns.

In general, the protective layer 1150 provides protection for the patterned surface of the molded resin layer 1110. For example, this layer can protect the anti-counterfeiting foil feature against chemical exposure and mechanical pressure applied in case of rubbing, scratching, etc. Protective layer 1150 is formed from a transparent material (in the visible spectrum), so that light can propagate too and from the patterned surface beneath it. The protective layer 1150 can have a refractive index that is the same as or similar to the molded resin layer (e.g., but not limited to, a difference can be 0.1 or less). This layer can be formed from a lacquer or varnish that is, e.g., but not limited to, water-based, UV-curable, or thermal curable. The protective layer 1150 can be a flexible polymer film. In some examples, the protective layer 1150 has a thickness in a range from about 2 microns to about 5 microns.

Examples of the present disclosure provide passive diffractive displays that include absorptive structures in a region of the frame-pixels that does not include diffractive structures, which reduces reflection and increase the signal-to-noise ratio at the viewing angles of the diffracted images, leading to boosted contrast and gloss reduction. The absorptive structures may include absorptive metastructures. The absorptive structures may be configured to display an additional, reflective image at off-diffraction angles. The unpopulated areas may include multiple different types of absorptive structures that are configured to reflect certain wavelengths of light such that the absorptive structures act as reflective sub-pixels such that the reflected image may be a color image. In diffractive displays that include micro-pixels having 3D facets, the absorptive structures of the frame-pixels may be configured to display multiple reflected images at off-diffraction angles such that a viewer observes a reflected animation sequence as the viewer moves through different viewing angles.

Figures 12A, 12B:
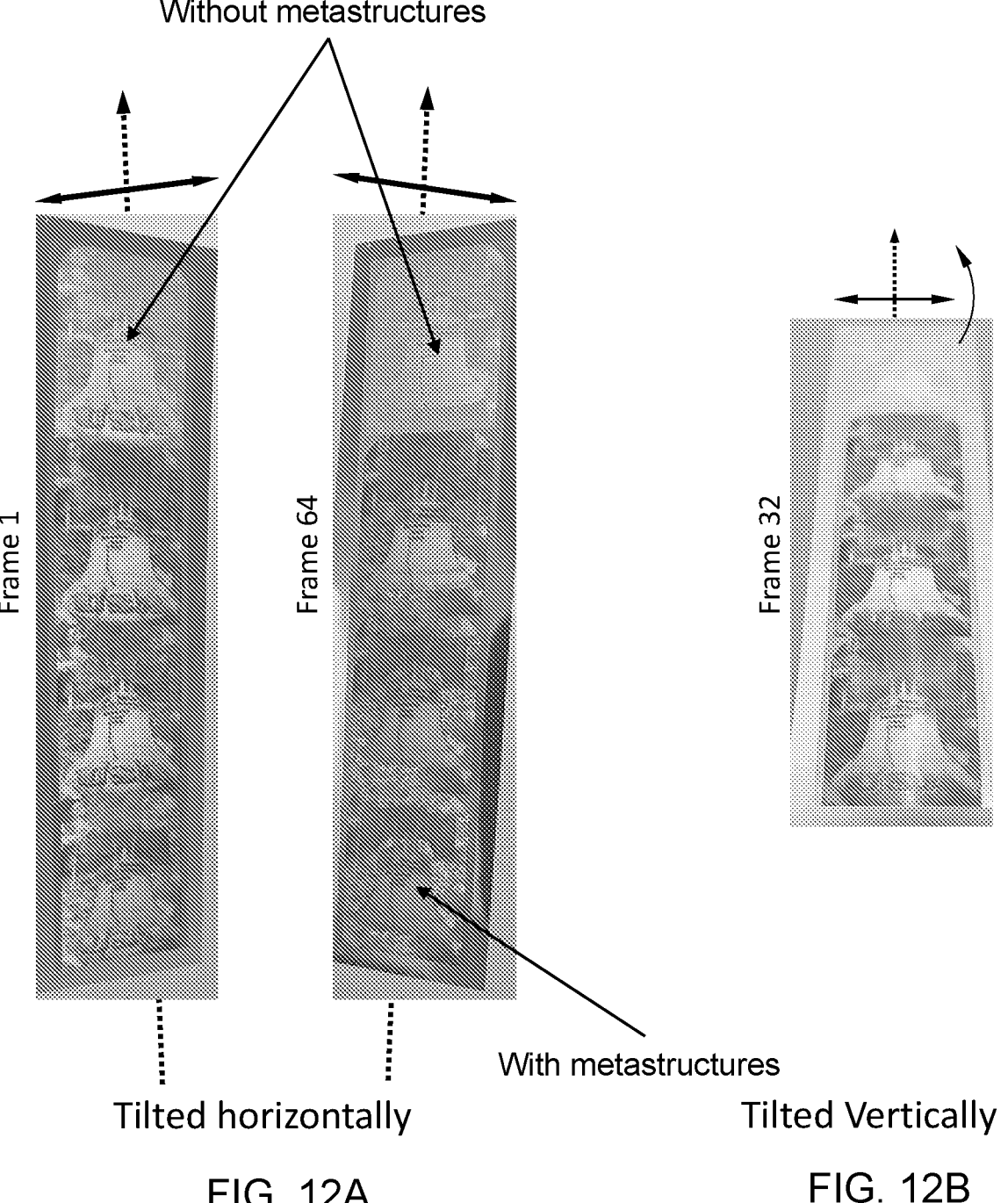
FIG. 12A is a photographic representation of an example of a passive diffractive display in different orientations according to examples of the present disclosure.
FIG. 12B is a photographic representation of the example of the passive diffractive display shown in FIG. 12A in a further orientation according to examples of the present disclosure.

Photographs of an example passive diffractive display are shown in FIGS. 12A and 12B. FIG. 12A shows frame 1 and frame 64 of an animation feature repeated four times along a stripe. In the images display, the bell moves and reveals 'USA' by rotating the feature horizontally and navigating from frame 1 to frame 64. The top feature does not include embedded absorptive metastructures (absorbing sub-pixels), but the other three embed three different types of absorptive metastructures (three various periodicity and dimensions: 2nd from top: P=176 nm, d=96 nm, 3rd from top: P=176 nm, d=112 nm, P=160 nm, d=96 nm). The passive display device here is a simplified version of the example shown in the example of FIG. 9, in which the cylinder shown in FIG. 9 is reduced to a two-facet microstructure. The top feature without absorptive pixels lacks contrast in comparison with the other three features which benefit from integrated dark pixels.

FIG. 12B shows the same feature as in FIG. 12B tilted vertically. The top feature that is only enabled by diffraction is OFF and offers low visibility at highly tilted angles. The other three features, which incorporate absorbing sub-pixels, provide a high contrast and visibility at highly tilted angles.

Figure 13A:
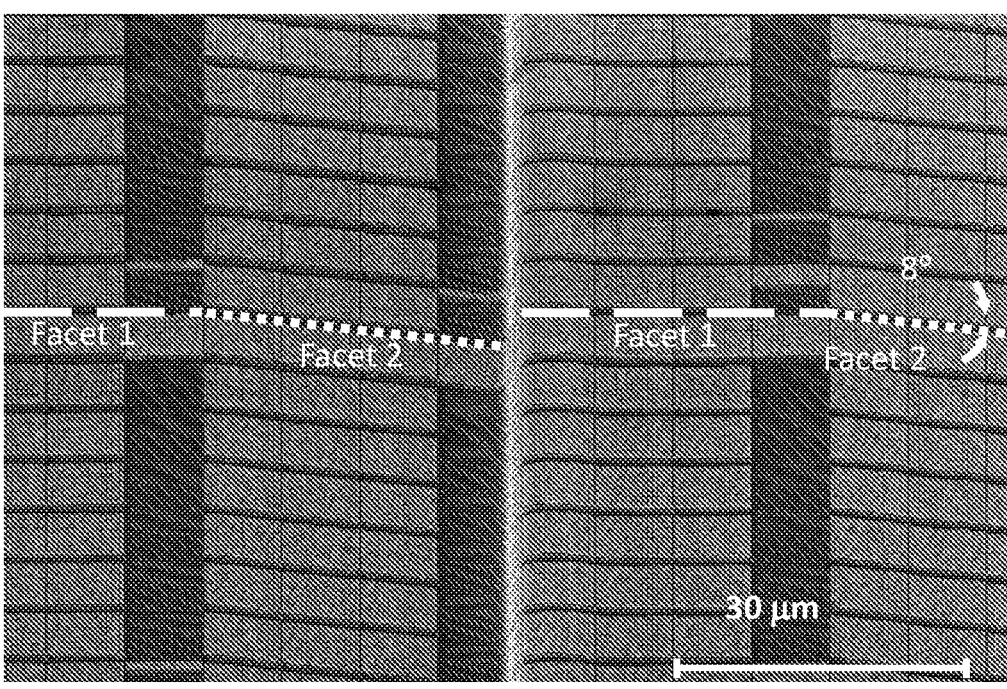
FIG. 13A is a photographic representation acquired with a scanning electron microscope of an example of a Ni shim useful for imprinting structures for passive diffractive displays according to examples of the present disclosure.
Figure 13B:
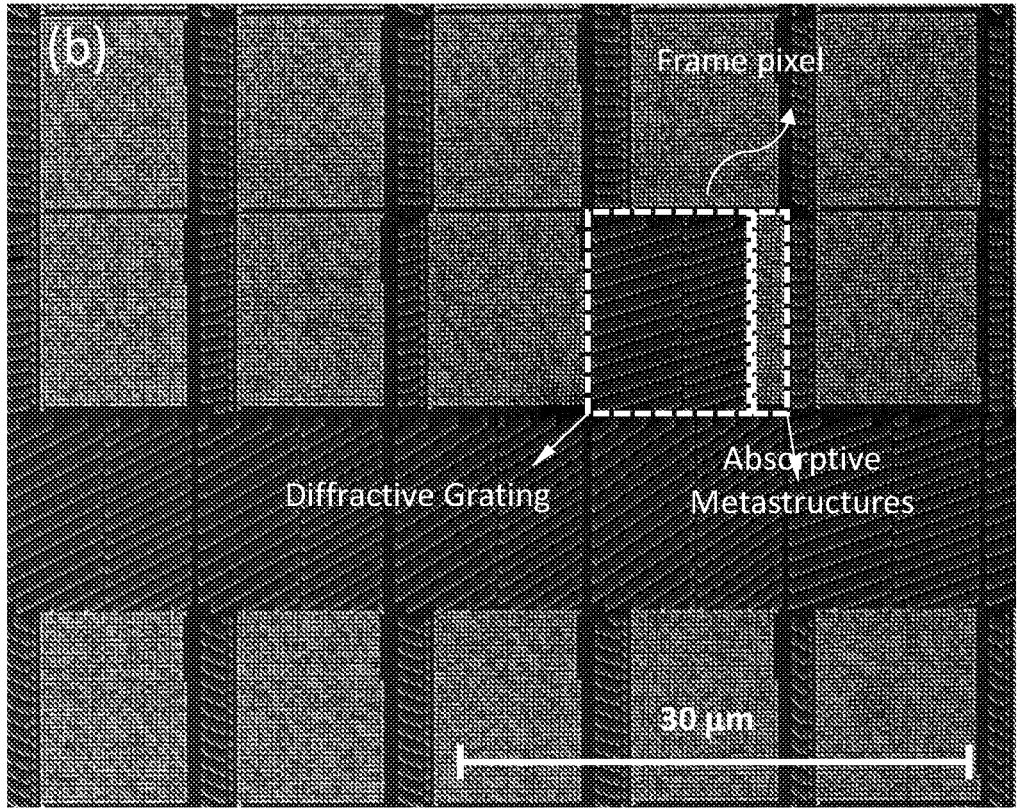
FIG. 13B is a photographic representation acquired with a scanning electron microscope of the example of the Ni shim useful for imprinting structures for passive diffractive displays according to examples of the present disclosure.

Scanning electron microscopy images of the Nickel shim used to as a stamp to imprint nanostructures is shown in FIGS. 13A and 13B. This shim is useful as a stamp to imprint nanostructures, along with their underlaid micro-structures (facets), onto UV resin. FIG. 13A shows frame pixels overlaid on bi-facet microstructures. The frame pixels embed diffractive blazed grating and absorptive metastructures. Here, an asymmetric bifacet is used to steer the light toward desired directions. FIG. 13B shows a zoomed in SEM image showing the diffractive and absorptive sections of a frame pixel on the Nickel shim.

EQUIVALENTS

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the scope of the appended claims. Accordingly, the specification and drawings are to be regarded in an illustrative sense rather than a restrictive sense. Although various features of the approach of the present disclosure have been presented separately (e.g., but not limited to, in separate figures), the skilled person will understand that, unless they are presented as mutually exclusive, they may each be combined with any other feature or combination of features of the present disclosure.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple examples separately or in any suitable subcombination.

Those skilled in the art will recognize, or be able to ascertain, using no more than routine experimentation, numerous equivalents to the specific examples described specifically herein. Such equivalents are intended to be encompassed in the scope of the following claims.

What is claimed is:

1. A diffractive display for displaying a diffracted image at a viewing angle, comprising:
   a layer having a plurality of frame-pixels corresponding to the diffracted image, each frame-pixel corresponding to the diffracted image including at least one diffractive structure disposed on the layer configured to have a fundamental diffraction order along the viewing angle of the diffracted image, the at least one diffractive structure disposed in a first region of the layer of the frame-pixel, and at least some of the frame-pixels corresponding to the diffracted image further comprising absorptive metastructures disposed on the layer, the absorptive metastructures configured to have a light absorption resonance in the visible spectrum, the absorptive metastructures disposed in a second region of the layer of the frame-pixel that is nonoverlapping with the first region;

wherein:

the absorptive metastructures are configured to absorb certain wavelengths of light to reduce noise level of the diffracted image at the viewing angle, but to reflect other wavelengths;

for each of the frame-pixels corresponding to the diffracted image, the size of the second region occupied by the absorptive metastructures is determined by a weighting factor for that frame-pixel such that light reflected by the frame-pixel has a selected reflectance, and light reflected from all of the frame-pixels forms a reflected image;

for each of the frame-pixels corresponding to the diffracted image, the absorptive metastructures comprise a plurality of sets of absorptive metastructures, each set of absorptive metastructures configured to reflect a different wavelength band of light; and the size of each of the sets of absorptive metastructures is determined by the weighting factor such that the light reflected from all of the sets of absorptive metastructures of the frame-pixel has the selected reflectance, hue, and saturation, and the light reflected from all of the absorptive metastructures of the frame-pixels forms the reflected image in multiple colors.

2. The diffractive display according to claim 1, wherein the absorptive metastructures are comprised of a plurality of nanostructure scatterers comprising a metallic material or a high refractive index (HRI) dielectric material.

3. The diffractive display according to claim 1, wherein the diffractive structures are configured to form the diffractive image at the viewing angle, while the absorptive metastructures are configured to form the reflected image at one or more off-diffractive angle.

4. An article, comprising:
a substrate; and
the diffractive display of claim 1 affixed to the substrate as an anti-counterfeiting foil.

5. The article of claim 4, wherein the article is a banknote or a credit card.

6. A diffractive display for displaying a diffracted image at a viewing angle, comprising:
a layer having a plurality of frame-pixels corresponding to the diffracted image, wherein:
each of the plurality of frame-pixels corresponding to the diffracted image comprises a populated region including at least one diffractive structure disposed on the layer and configured to have a fundamental diffraction order along the viewing angle of the diffracted image;

at least some of the plurality of frame-pixels corresponding to the diffracted image further comprise a second region without diffractive structures, at least some of the second regions comprises an absorptive metastructure disposed on the layer, the absorptive metastructure is configured to have a light absorption resonance in the visible spectrum, for each of the plurality of frame-pixels having a second region, the second region of the layer of the frame-pixel is nonoverlapping with the populated region of the layer of the frame-pixel;

the absorptive metastructure is configured to absorb certain wavelengths of light, but to reflect other wavelengths; and for each frame-pixel having a second region, the second region comprises a plurality of different absorptive metastructures, each configured to reflect different wavelengths of light; and wherein the diffractive structures are configured to form the diffracted image, while the absorptive metastructures are configured to form a reflected image at one or more angle differing from the viewing angle of the diffracted image.

7. The diffractive display of claim 6, wherein the frame-pixels having a second region have a filling factor less than 1.

8. The diffractive display of claim 6, wherein the absorptive metastructure is configured to reduce noise level associated with intra-pixel reflection and/or inter-pixel reflection.

9. The diffractive display of claim 6, wherein the absorptive metastructure is configured as an omnidirectional absorber.

10. The diffractive display of claim 6, wherein the absorptive metastructure comprises nanostructure scatterers.

11. The diffractive display of claim 6, wherein the absorptive metastructure comprises plasmonic structures.

12. The diffractive display of claim 6, wherein the reflected image is multi-color.

13. The diffractive structure of claim 6, wherein each populated region includes one or more sub-pixels, wherein for at least some of the plurality of frame-pixels corresponding to the diffracted image, the one or more sub-pixels comprise a plurality of sub-pixels according to an additive and/or subtractive color scheme, and each of the sub-pixels of the frame-pixel comprises different diffractive structure.

14. An article, comprising:
a substrate; and
the diffractive display of claim 6 affixed to the substrate as an anti-counterfeiting foil.

15. The article of claim 14, wherein the article is a banknote or a credit card.

* * * * *